(12) United States Patent
Ikeda

(10) Patent No.: US 8,619,624 B2
(45) Date of Patent: Dec. 31, 2013

(54) NETWORK PERFORMANCE ESTIMATING DEVICE, NETWORK PERFORMANCE ESTIMATING METHOD AND STORAGE MEDIUM HAVING A NETWORK PERFORMANCE ESTIMATING PROGRAM STORED THEREIN

(75) Inventor: Yoshiro Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 564 days.

(21) Appl. No.: 12/050,439

(22) Filed: Mar. 18, 2008

(65) Prior Publication Data

US 2008/0239967 A1   Oct. 2, 2008

(30) Foreign Application Priority Data

Mar. 27, 2007   (JP) .................. 2007-081812

(51) Int. Cl.
*H04L 12/00*   (2006.01)

(52) U.S. Cl.
USPC .......... 370/254; 703/23; 703/26; 379/221.15; 370/255

(58) Field of Classification Search
USPC ........... 379/221.15; 370/252, 254; 703/23, 26
See application file for complete search history.

(56) References Cited

U.S. PATENT DOCUMENTS

| 5,680,326 | A | * | 10/1997 | Russ et al. ........................ 714/4 |
| 7,774,440 | B1 | * | 8/2010 | Bagrodia et al. ............... 709/221 |
| 2006/0109793 | A1 | * | 5/2006 | Kim et al. ...................... 370/250 |
| 2006/0198382 | A1 | * | 9/2006 | Sagara et al. .................. 370/400 |

FOREIGN PATENT DOCUMENTS

| JP | 06-059939 | 3/1994 |
| JP | 11-508422 | 7/1999 |
| JP | A 11-284691 | 10/1999 |
| JP | A 2000-105713 | 4/2000 |

OTHER PUBLICATIONS

Japanese office action issued in corresponding Japanese App. No. 2007-081812, dated Aug. 23, 2011 (with partial translation).

* cited by examiner

*Primary Examiner* — Omer Mian
(74) *Attorney, Agent, or Firm* — Greer, Burns & Crain, Ltd

(57) ABSTRACT

A network performance estimating device for estimating network performance of a parallel computing machine for executing plural processes in parallel, includes a communication data obtaining unit that obtains communication data output from plural calculation nodes when the plural processes are executed by using the plural calculation nodes, a design estimating unit for referring to a design information storing unit that stores design information defining a network as an estimation target to execute a simulation on communications when the communication data obtained by the communication data obtaining unit are transmitted through the network as the estimation target, and renews estimation information representing an estimation result of the estimation target network stored by an estimation information storing unit on the basis of the obtained simulation result, and a communication data transmission unit for transmitting the communication data obtained by the communication data obtaining unit to an addressed calculation node.

15 Claims, 22 Drawing Sheets

FIG. 7

| \|   | LINK INFORMATION TABLE | | | | | |
|---|---|---|---|---|---|---|
| OUTPUT NODE | OUTPUT PORT | INPUT NODE | INPUT PORT | BAND WIDTH | DELAY TIME | REMARKS |
| 0 | 0 | 1 | 2 | 1000 | 10 | — |
| 1 | 0 | 2 | 2 | 1000 | 10 | — |
| ⋮ | ⋮ | ⋮ | ⋮ | ⋮ | ⋮ | ⋮ |
| 1 | 2 | 0 | 0 | 1000 | 10 | — |
| 2 | 2 | 1 | 0 | 1000 | 10 | — |
| ⋮ | ⋮ | ⋮ | ⋮ | ⋮ | ⋮ | ⋮ |
| 0 | 1 | 4 | 3 | 100 | 10 | — |
| 1 | 1 | 5 | 3 | 100 | 10 | fail@1500 |
| ⋮ | ⋮ | ⋮ | ⋮ | ⋮ | ⋮ | ⋮ |
| 4 | 3 | 0 | 1 | 100 | 10 | — |
| 5 | 3 | 1 | 1 | 100 | 10 | fail@1500 |
| ⋮ | ⋮ | ⋮ | ⋮ | ⋮ | ⋮ | ⋮ |

| NODE | CALCULATION TIME | ESTIMATION INFORMATION TABLE 131 |||||
|---|---|---|---|---|---|---|
| | | PORT NUMBER | BUFFER MAXIMUM LENGTH | BUFFER AVERAGE LENGTH | OPERATION RATE | AVERAGE DELAY |
| 0 | 100 | 0 | 8 | 2 | 21% | 10 |
| | | 1 | 32 | 8 | 54% | 10 |
| 1 | — | 0 | 16 | 2.5 | 38% | 10 |
| | | 1 | 64 | 16 | 72% | 10.2 |
| | | 2 | 32 | 8 | 54% | 10 |
| ... | ... | ... | ... | ... | ... | ... |

NETWORK PERFORMANCE ESTIMATING DEVICE, NETWORK PERFORMANCE ESTIMATING METHOD AND STORAGE MEDIUM HAVING A NETWORK PERFORMANCE ESTIMATING PROGRAM STORED THEREIN

The present invention relates to a network performance estimating device, a network performance estimating method and a storage medium having a network performance estimating program stored therein.

BACKGROUND

Recently, in connection with progression of hardware techniques, the processing performance of computing machines has been rapidly enhanced. At times, processing performance which exceeds the processing performance of one computing machine is required. When such processing is executed, a parallel computing machine is generally used. A parallel computing machine is a computer or a computing system that is constructed with plural calculation nodes each having a computing machine and a network for connecting these calculation nodes. In the parallel computing machine, respective processes to be executed at the respective calculation nodes execute processing while making communications with the other processes and machines. Since the plural processes are executed in parallel, the processing time for a large-scale calculation can be greatly shortened.

The processing capacity of the parallel computing machine is greatly dependent on the design of the network. This is because if the communication between processes is inefficient, the communication time is increased and the rate of the calculation time is relatively lowered. This is more remarkable as the scale of the parallel computing machine is larger, that is, the number of the calculation nodes increases. Furthermore, various design elements are required to be considered to design an optimum network. For example, it is necessary to consider a physical element such as the connection relationship among calculation nodes and a functional element such as a communication route determining method (routing algorithm) or the like. Furthermore, it is also dependent on whether the design of a network is optimum or not.

Therefore, when a parallel computing machine is developed, in order to find out the design of an optimum network, it is necessary to repetitively design a network, estimate the performance of the designed network and then correct the design on the basis of the estimation result. At present, the performance estimation of a network on the basis of simulation is generally executed.

SUMMARY

According to an aspect of an embodiment, a network performance estimating device for estimating network performance of a parallel computing machine for executing plural processes in parallel, comprises:

a communication data obtaining unit that obtains communication data output from plural calculation nodes when the plural processes are executed by using the plural calculation nodes;

a design estimating unit for referring to a design information storing unit for storing design information defining a network as an estimation target to execute a simulation on communications when the communication data obtained by the communication data obtaining unit are transmitted through the network as the estimation target, and renewing estimation information representing an estimation result of the estimation target network stored by an estimation information storing unit on the basis of the obtained simulation result; and a communication data transmission unit for transmitting the communication data obtained by the communication data obtaining unit to an addressed calculation node.

BRIEF DESCRIPTION OF THE DRAWINGS

FIG. 7 is a diagram showing an example of the data structure of a link information table;

FIG. 14 is a diagram showing an example of the data structure of an estimation information data;

EMBODIMENTS

There is a method in which a test model of a parallel computing machine is made and the performance of a network is estimated by using this test model to find out the design of an optimum network. That is, according to this method, a parallel program is executed by the test model, and a communication situation is monitored by a router or the like, thereby checking the efficiency of the communication. However, when a parallel computing machine to be developed is a large-scale machine, a large load is imposed on a work of making the test model is burdensome, and it is not realistic to use this estimation method.

Therefore, a network performance estimation based on a simulation is generally performed. A first estimation method is a method of virtually reproducing all the constituent elements of a parallel computing machine according to a simulation program and executing a communication simulation on a single computing machine. According to this estimating method, if the physical performance and function of each constituent element can be faithfully reproduced by a simulation program, the same level of accurate estimation result as a case where a test model is used can be obtained. However, in this first estimation method, the load imposed on the work of creating a simulation program is very large. This is because the number of constituent elements to be reproduced is large and also it is required to execute a work of verifying whether the created simulation program itself is right. Furthermore, there is a problem that the time required to execute a simulation is increased because the processing that should be originally executed in parallel at plural calculation nodes is reproduced on a single computing machine.

A second method may be a method of inputting design information of each constituent element information of a parallel computing machine in advance and executing a communication simulation on the basis of design information. This estimation method is a simple method, and it can rapidly and easily estimate the performance of the network. However, this second method has a problem that the estimation result lacks correctness. This is because the performance of the network is greatly dependent on the timing of communications and the timing itself is not accurately reproduced.

This embodiment has an object to solve the above problem.

Figure 1:
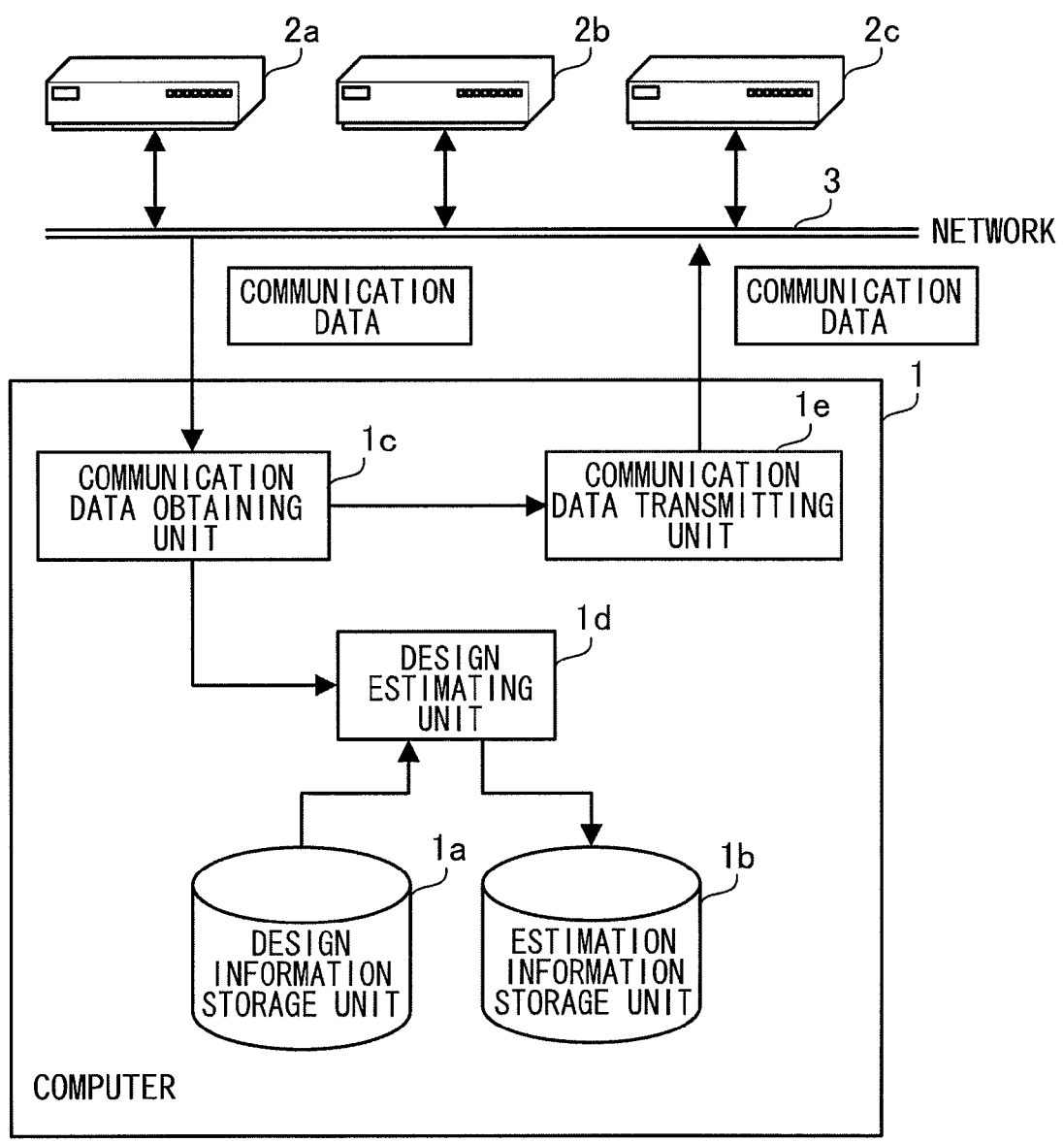
FIG. 1 is a diagram showing an overview of the embodiment of the present invention.

FIG. 1 is a diagram showing the overview of this embodiment. A computer 1 shown in FIG. 1 estimates network performance of a parallel computing machine for executing plural processes in parallel. The computer 1 is connected through a network 3 to calculation nodes 2a, 2b, 2c executing processes. The computer 1 has a design information storage unit 1a, an estimation information storage unit 1b, a communication data obtaining unit 1c, a design estimating unit 1d and a communication data transmitting unit 1e.

Design information defining a network as an estimation target is stored in the design information storage unit 1a. The design information contains information representing the physical construction of the network and the function of the network. The physical construction of the network includes the structure (topology) of links for connecting calculation nodes, the communication speed of each link, the arrangement and capacitance of communication buffers, etc., for example. The functions of the network include a routing algorithm, a communication protocol, etc., for example.

Estimation information for indicating an estimation result of the network as an estimation target is stored in the estimation information storage unit 1b. The estimation information contains information representing the average of the communication time of each link, the average of the operation rate of each link, the average length and maximum length of each communication buffer, etc., for example.

The communication data obtaining unit 1c obtains communication data transmitted/received through the network 3 among the calculation nodes 2a, 2b, 2c. Here, various methods are considered to enable the computer 1 to obtain communication data. For example, there is a method of architecting the network 3 so that the communication data output from the calculation nodes 2a, 2b, 2c are necessarily passed through the computer 1. Furthermore, there is also a method in which the calculation nodes 2a, 2b, 2c or the communication device in the network 3 temporarily rewrites the destination address of the communication data to the address of the computer 1.

The design estimating unit 1d refers to the design information storage unit 1a to execute a communication simulation for a situation that the communication data obtained by the communication data obtaining unit 1c are transmitted through a network as an estimation target. In the communication simulation, the timing at which a communication occurs and a communication route are specified, and a transmission standby time at each communication buffer, etc. are calculated. The design estimating unit 1d renews the estimation information stored in the estimation information storage unit 1b on the basis of the obtained simulation result.

The communication data transmitting unit 1e transmits the communication data obtained by the communication data obtaining unit 1c to a destination calculation node. Here, when the destination address of the communication data is temporarily rewritten to the address of the computer 1, the communication data transmitting unit 1e rewrites the destination address to the address of a calculation node to be originally addressed.

According to the computer 1 as described above, when plural processes are executed by using the plural calculation nodes 2a, 2b, 2c, the communication data output from the calculation nodes 2a, 2b, 2c are obtained by the communication data obtaining unit 1c. The communication simulation for the case where the obtained communication data are transmitted through the estimation target network is executed by the design estimating unit 1d, and the estimation information is renewed on the basis of the obtained simulation result. The obtained communication data are transmitted to the destination calculation node by the communication data transmitting unit 1e.

Accordingly, the work needed to prepare for the simulation is greatly reduced, and also the time required for the simulation is shortened. Furthermore, the accurate estimation result corresponding to the timing of the communication which actually occurs can be obtained. Furthermore, the simulation can be executed on a real-time basis without using any intermediate data such as a communication log or the like, so that it is unnecessary to hold a flood of data.

Embodiments according to the present invention will be described below with reference to the accompanying drawings.

First Embodiment

Figure 2:
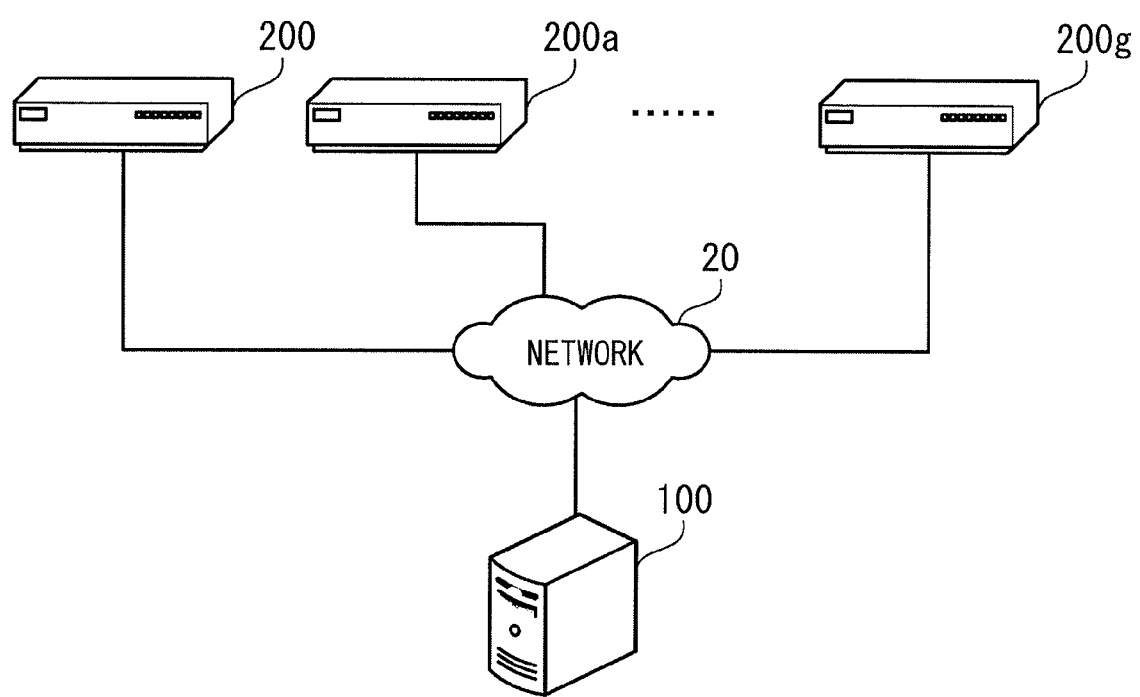
FIG. 2 is a diagram showing a system construction of a first embodiment.

FIG. 2 is a diagram showing the system construction of a first embodiment. The simulation system shown in FIG. 2 comprises a simulation sever 100, eight calculation nodes 200, 200a, . . . , 200g and a network 20. The simulation server 100 and the calculation nodes 200, 200a, . . . , 200g can communicate with one another through the network 20.

The simulation server 100 is a server computer for executing a simulation to estimate the network performance of a parallel computing machine. The simulation server 100 receives a message transmitted from each of the calculation nodes 200, 200a, . . . , 200g. The simulation server 100 executes a communication simulation on the basis of the received message on a real-time basis. The simulation server 100 transmits the received message according to the destination node number of an original destination node contained in the message.

Each of the calculation nodes 200, 200a, . . . , 200g is a computer for executing a process. A parallel program defining a processing content is arranged in advance in each of the calculation nodes 200, 200a, ..., 200g. Each of the calculation nodes 200, 200a, ..., 200g generates and executes a process on the basis of the parallel program when the processing starts.

Here, a unique node number is allocated to each of the calculation nodes 200, 200a, ..., 200g in advance. When each process communicates with another process, the process concerned indicates a destination node number and outputs communication data to the other process corresponding to the destination node number. At this time, each of the calculation nodes 200, 200a, ..., 200g adds the destination node number to the communication data output by the process, and transmits the addition result as a message to the simulation server 100.

Furthermore, when receiving a message transmitted from the simulation server 100, the calculation nodes 200, 200a, ..., 200g deliver communication data contained in the message to the process, whereby the reception and transmission of the communication data are carried out among the processes, thereby carrying out parallel processing.

Next, the hardware construction of the simulation server 100 and each of the calculation nodes 200, 200a, ..., 200g will be described.

Figure 3:
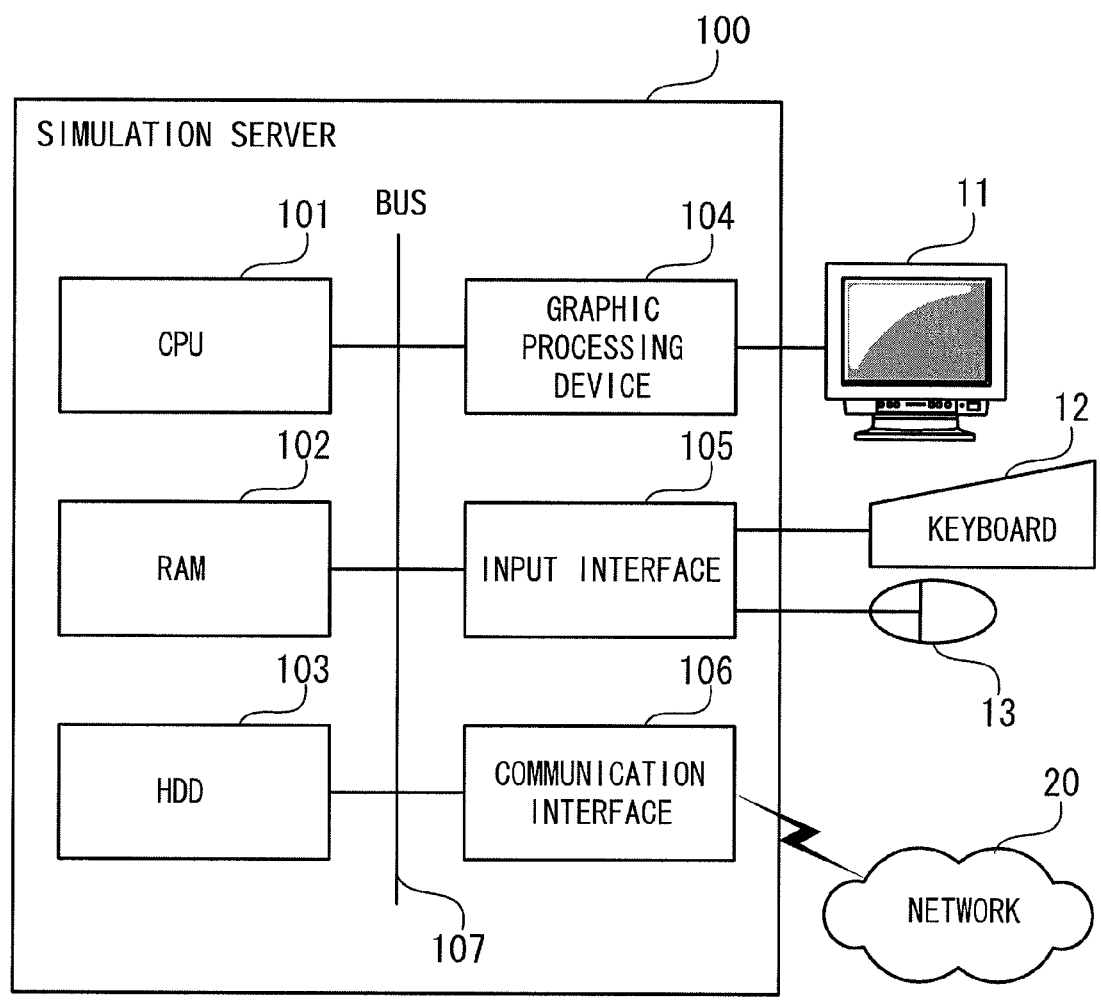
FIG. 3 is a diagram showing the hardware construction of a simulation server.

FIG. 3 is a diagram showing the hardware construction of the simulation server. The overall simulation server 100 is controlled by CPU (Central Processing Unit) 101. RAM (Random Access Memory) 102, a hard disk drive (HDD) 103, a graphic processing device 104, an input interface 105 and a communication interface 106 are connected to CPU 101 through a bus 107.

At least a part of an OS (Operating System) and application programs which are to be executed by CPU 101 are temporarily stored in RAM 102. Furthermore, at least a part of various kinds of data required for the processing of CPU 101 is temporarily stored in RAM 102. The OS program and the application programs are stored in HDD 103. Furthermore, various kinds of data required for the processing of CPU 101 are stored in HDD 103.

A monitor 11 is connected to the graphic processing device 104. The graphic processing device 104 displays an image on the screen of the monitor 11 according to a command from CPU 101. A keyboard 12 and a mouse 13 are connected to the input interface 105. The input interface 105 transmits a signal transmitted from the keyboard 12 or the mouse 13 to CPU 101 through the bus 107. The communication interface 106 is connected to the network 20.

The calculation nodes 200, 200a, ..., 200g can be implemented by the same hardware construction as the simulation server 100. The processing function of this embodiment can be implemented by the hardware construction as described above.

Next, the module construction of the simulation server 100 and the calculation nodes 200, 200a, ..., 200g will be described.

Figure 4:
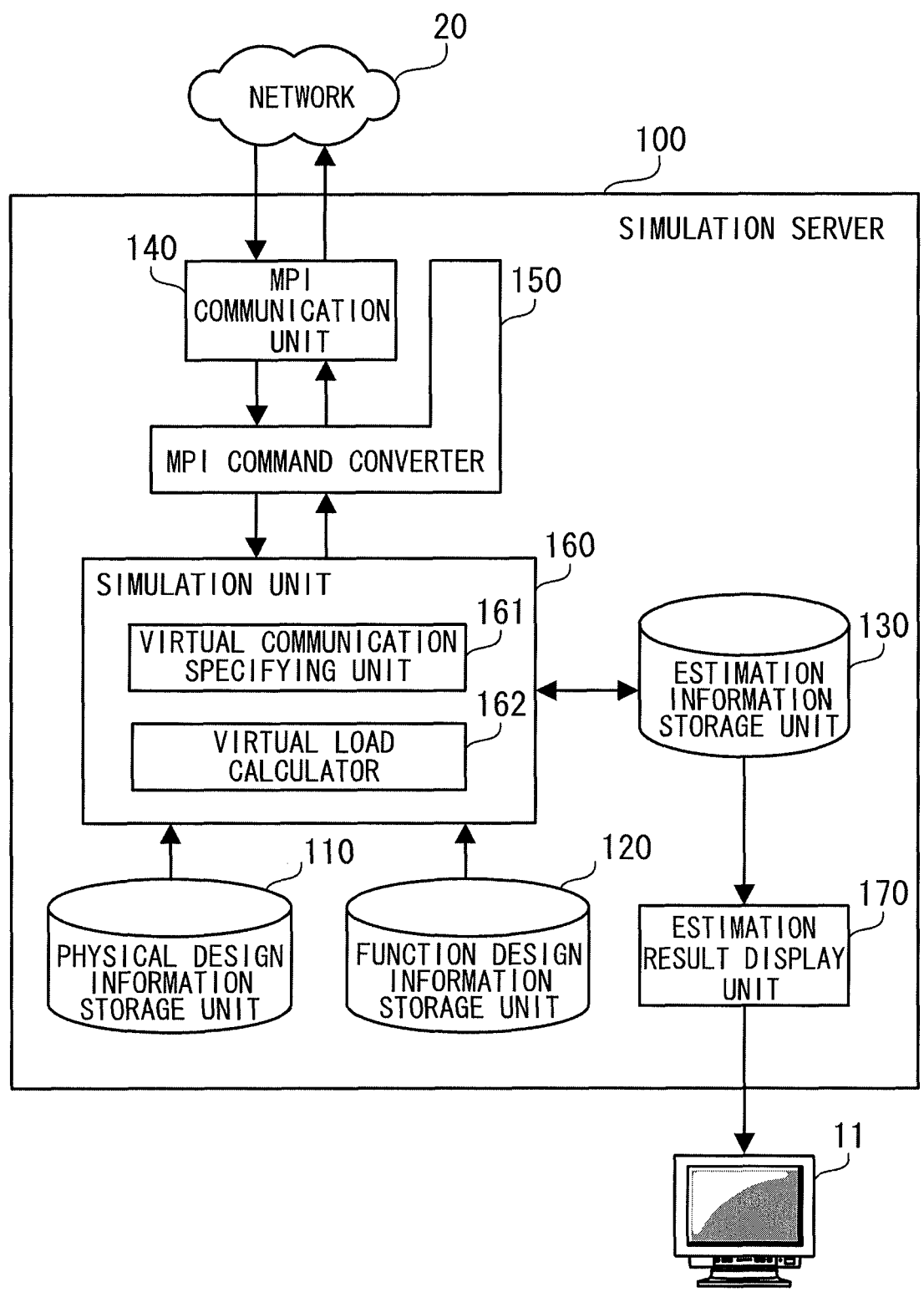
FIG. 4 is a block diagram showing the function of the simulation server.

FIG. 4 is a block diagram showing the function of the simulation server. The simulation server 100 has a physical design information storage unit 110, a function design information storage unit 120, an estimation information storage unit 130, an MPI (Message Passing Interface) communication unit 140, an MPI command converter 150, a simulation unit 160 and an estimation result display unit 170. The MPI communication unit 140 can communicate with the calculation nodes 200, 200a, ..., 200g through the network 20. The estimation result display unit 170 can display various kinds of information on the monitor 11.

Design information concerning the physical elements of the network which are part of the performance estimation target is stored in the physical design information storage unit 110. Specifically, information representing the topology of the network, information representing the communication band and delay time of each link constituting the network, information representing the storage capacity and managing method of the communication buffer for temporarily storing the transmission standby message, etc. are stored. A user compiles this design information before a simulation is executed and stores the design information concerned into the physical design information storage unit 110.

Design information concerning the functional elements of the network that is the performance estimation target is stored in the function design information storage unit 120. Specifically, information representing a routing algorithm for determining a communication route, information representing a communication protocol used to transmit/receive a message, etc. are stored. These functions are normally implemented by software itself or by the combination of software and hardware in an actual parallel computing machine. These design parameters are created by a user before a simulation is executed, and stored in the function design information storage unit 120 as design informations.

In the estimation information storage unit 130 is stored estimation information representing a result of the performance estimation of the network defined by the design information stored in the physical design information storage unit 110 and the function design information storage unit 120. Specifically, information representing the operation rate and average delay time of each link, information representing the average length and maximum length of each communication buffer, etc. are stored. Furthermore, information representing the load states of the calculation nodes 200, 200a, ..., 200g is also stored in the estimation information storage unit 130.

The estimation information stored in the estimation information storage unit 130 is successively renewed by the simulation unit 160 in connection with the progress of the simulation. The estimation information at the time when the simulation is finished represents the final performance estimation result.

According to the specification of MPI (Message Passing Interface), the MPI communication unit 140 transmits/receives messages to/from the calculation nodes 200, 200a, ..., 200g. MPI is a standard for defining functions which can be called from the programs when a message is transmitted/received. For example, a function for transmitting a message to one calculation node, a function for simultaneously transmitting a message(s) to plural calculation nodes, etc. are defined. The specification of MPI is managed by a MPI forum of a standardization organization.

Here, the message transmitted/received to/from the calculation nodes 200, 200a, ..., 200g contains not only the communication data output from the process, but also addition information and an MPI header. The addition information and the MPI header will be described in detail later.

When receiving a message from each of the calculation nodes 200, 220a, ..., 200g, the MPI communication unit 140 separates the MPI header from the message and delivers to the MPI command converter 150 the message from which the MPI-header is separated. Furthermore, when receiving the data comprising addition information and communication data from the MPI command converter 150, the MPI communication unit 140 adds the MPI header to the data concerned, and transmits it to a calculation node as a destination. The function of the MPI communication unit 140 as described above can be implemented by executing a generally available MPI library.

The MPI command converter 150 relays data between the MPI communication unit 140 and the simulation unit 160. Specifically, when receiving from the MPI communication unit 140 the message from which the MPI header is separated, the MPI command converter 150 further separates the addition information from the message concerned, and delivers to the simulation unit 160 the message from which the addition information is further separated. When receiving the communication data from the simulation unit 160, the MPI command converter 150 adds the addition information to the communication data, and delivers it to the MPI communication unit 140.

When the start of the simulation is instructed by a user's input operation, the simulation unit 160 executes a communication simulation on the basis of the data received from the MPI command converter 150. When the end of the simulation is instructed by the user's input operation, the simulation unit 160 stops the simulation. The simulation unit 160 has a virtual communication specifying unit 161 and a virtual load calculator 162.

The virtual communication specifying unit 161 specifies a virtual communication content for transmitting the communication data received from the MPI command converter 150 on the basis of the design information stored in the physical design information storage unit 110 and the function design information storage unit 120. For example, the virtual communication specifying unit 161 specifies a virtual communication occurrence timing and a communication route.

The virtual load calculator 162 calculates the load state of each link on the basis of the virtual communication content specified by the virtual communication specifying unit 161 and the design information stored in the physical design information storage unit 110 and the function design information storage unit 120 on a real-time basis. For example, the virtual load calculator 162 specifies the communication condition of each link at each time point and calculates the operation rate of each link and the amount of communication data which waits for transmission due to occurrence of conflict.

On the basis of the calculation result, the virtual load calculator 162 successively renews the estimation information stored in the estimation information storage unit 130. With respect to indexes representing average values such as the average length of the communication buffers, the operation rate of each link, etc., the average values over the overall simulation time may be stored in the estimation information storage unit 130, and the average values of every predetermined time may be stored in the estimation information storage unit 130, to grasp a chronological change.

The virtual load calculator 162 estimates the load states of the calculation nodes 200, 200a, . . . , 200g on the basis of the occurrence timing of the communication specified by the virtual communication specifying unit 161. Then, the virtual load calculator 162 stores the estimation together with the estimation result of the network performance into the estimation information storage unit 130.

After the simulation is finished, the estimation result display unit 170 obtains the estimation information from the estimation information storage unit 130. The estimation result display unit 170 generates visible data such as a graph, etc. and displays them on the monitor 11.

Figure 5:
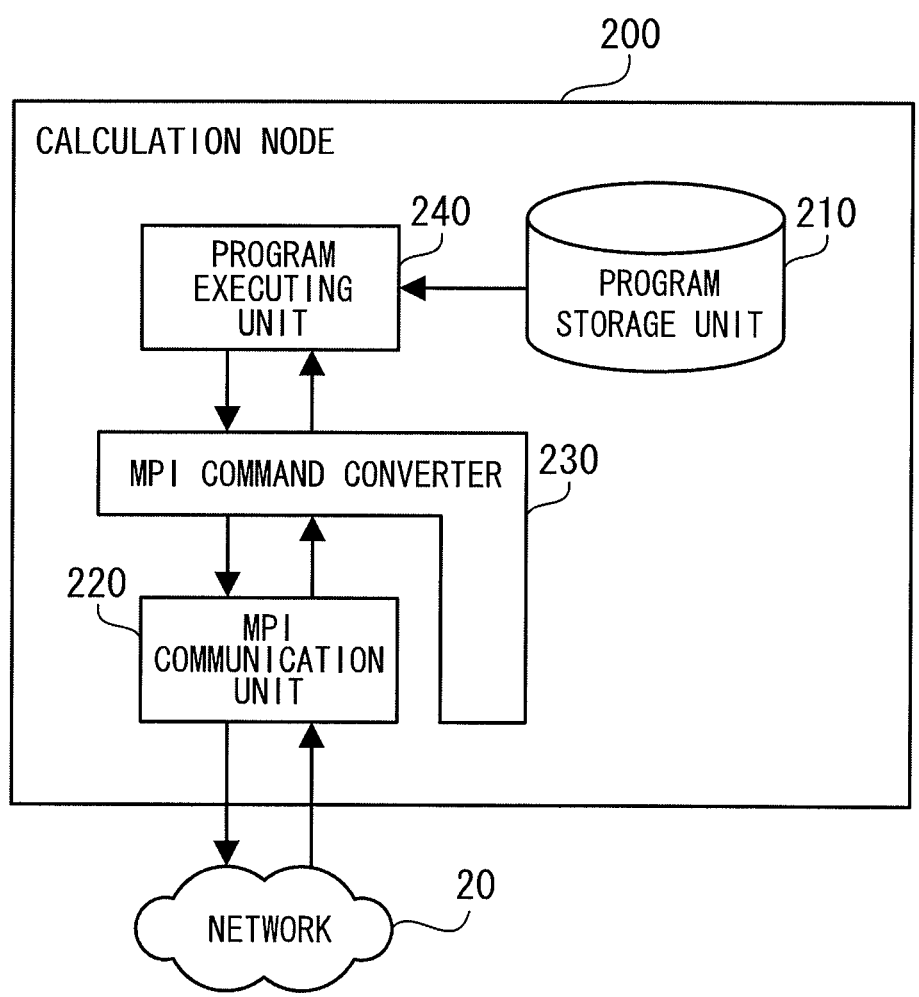
FIG. 5 is a block diagram showing the function of a calculation node according to the first embodiment.

FIG. 5 is a block diagram showing the calculation node of the first embodiment. The calculation node 200 has a program storage unit 210, an MPI communication unit 220, an MPI command converter 230 and a program executing unit 240. The MPI communication unit 220 can communicate with the simulation server 100 and the other calculation nodes 200a, . . . , 200g through the network 20.

A parallel program defining the processing content of the parallel processing is stored in the program storage unit 210. The parallel program is created in advance by a user, and stored in the program storage unit 210.

According to the specification of MPI, the MPI communication unit 220 transmits/receives a message to/from the simulation server 100. Specifically, when receiving a message from the simulation server 100, the MPI communication unit 220 separates the MPI header from the message, and delivers to the MPI command converter 230 the message from which the MPI header is separated. When receiving the data comprising addition information and the communication data from the MPI command converter 230, the MPI communication unit 220 adds the data concerned with the MPI header, and transmits it to the simulation server 100. The function of the MPI communication unit 220 as described above can be implemented by executing a generally available MPI library.

The MPI command converter 230 relays data between the MPI communication unit 220 and the program executing unit 240. Specifically, when receiving from the MPI communication unit 220 the message from which the MPI header is separated, the MPI command converter 230 further separates the addition information from the message, and delivers to the program executing unit 240 the message from which the addition information is further separated. Furthermore, when receiving the communication data from the program executing unit 240, the MPI command converter 230 adds the addition information to the communication data, and delivers it to the MPI communication unit 220.

When the start of the processing is instructed, the program executing unit 240 obtains the parallel program from the program storage unit 210. Then, the program executing unit 240 executes the process on the basis of the obtained parallel program. When the communication data is output during the execution of the program, the program executing unit 240 delivers the communication data to the MPI command converter 230. Furthermore, when receiving communication data from the MPI command converter 230, the received communication data are used for the processing. When the end of the processing is instructed, the program executing unit 240 stops the processing.

The calculation nodes 200a, . . . , 200g can be implemented by the same module construction as the calculation node 200.

Next, an example of the design information used at the simulation server 100 will be described.

Figure 6:
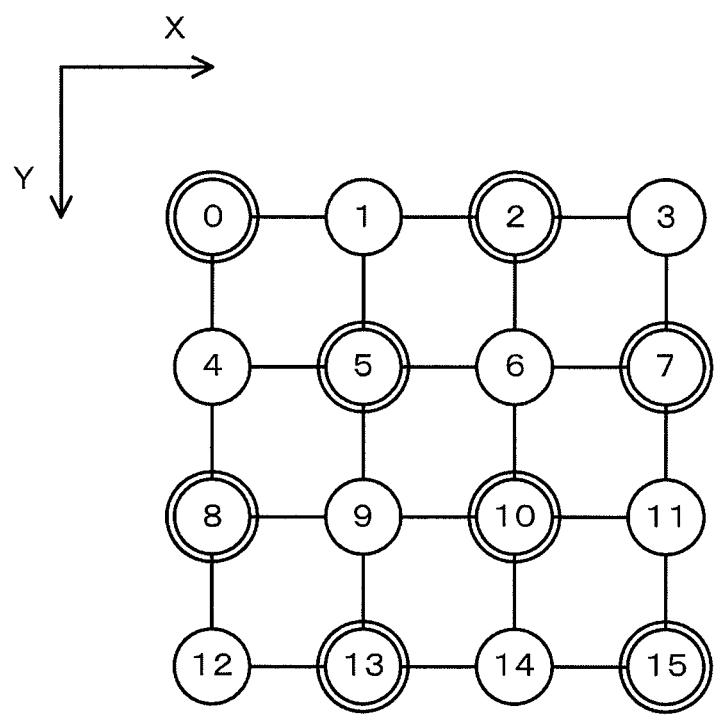
FIG. 6 is a diagram showing an example of topology of a network.

FIG. 6 is a schematic diagram showing an example of the topology of the network. The topology shown in FIG. 6 is an example of a two-dimensional mesh network whose one side length is equal to 4. The two-dimensional mesh network whose one side length is equal to 4 is constructed by 16 nodes and 24 links. Any unique node number from 0 to 15 is allocated to each node.

Nodes of node numbers 0, 2, 5, 7, 8, 10, 13 and 15 corresponds to calculation nodes 200, 200a, . . . , 200g. Nodes of node numbers 1, 3, 4, 6, 9, 11, 12, 14 correspond to routers. When a communication is made from the calculation node 200 to the calculation node 200a on the shortest route, the communication passes through the router corresponding to the node number 1. Nodes which do not execute the calculation are virtually defined as described above, and thus it is unnecessary to prepare for actual routers for the simulation.

The topology of the network as described above is defined on the basis of the design information stored in the physical design information storage unit 110.

FIG. 7 is a diagram showing an example of the data structure of a link information table. The link information table 111 shown in FIG. 7 is stored in the physical design information storage unit 110. The link information stored in the link information table 111 is design information which defines the topology of the two-dimensional mesh type network shown in FIG. 6 and the communication capability of each link.

In the link information table 111 are provided an item indicating an output node, an item indicating an output port, an item indicating an input node, an item indicating an input port, an item indicating band width, an item indicating a delay time and an item indicating remarks. The information pieces of the respective items arranged in the lateral direction are associated with one another.

The node number of a node serving as a link starting point is set at the item indicating the output node. The port number indicating the direction of the link when viewed from the node serving as the starting point is set at the item indicating the output port. Specifically, the port number in the positive direction of the X-axis in FIG. 6 is equal to 0, the port number in the positive direction of the Y-axis is equal to 1, the port number in the negative direction of the X-axis is equal to 2, and the port number in the negative direction of the Y-axis is equal to 3.

The node number of the node serving as a link end point is set at the item indicating the input node. The port number indicating the direction of the link when viewed from the node serving as the end point is set at the item indicating the input port. The meaning of the port number is the same as the port number of the output port.

A numerical value indicating a communication band is set at the item indicating the band width. The unit of the band width is Mbps (Mega bit per second). A numerical value indicating the time required to transmit a signal from the node serving as the starting point to the node serving as the end point is set at the item indicating the delay time. The unit of the delay time is ns (nanosecond). A physical communication condition other than the band width and the delay time is set at the item indicating the remarks. For example, when trouble occurs in the link after the simulation is started, a trouble time is set.

Information concerning all usable links is stored in the link information table 111. When some links are set to be unusable, the information of the links concerned may be deleted from the link information table 111. Furthermore, the link information may be set on a one-way basis. Accordingly, links which can be used for only one-way communication may be defined.

The information stored in the link information table 111 is defined in advance by a user. For example, the information of the output node of "1", the output port of "1", the input node of "5", the input port of "3", the band width of "100", the delay time of "10" and the remarks of "fail@1500" is stored. This indicates that the link from the router having the node number of "1" to the calculation node having the node number of "5" has the communication band of 100 Mbps and the delay time of 10 ns, and a trouble occurs after 1500 seconds from the start of the simulation.

Figure 8:
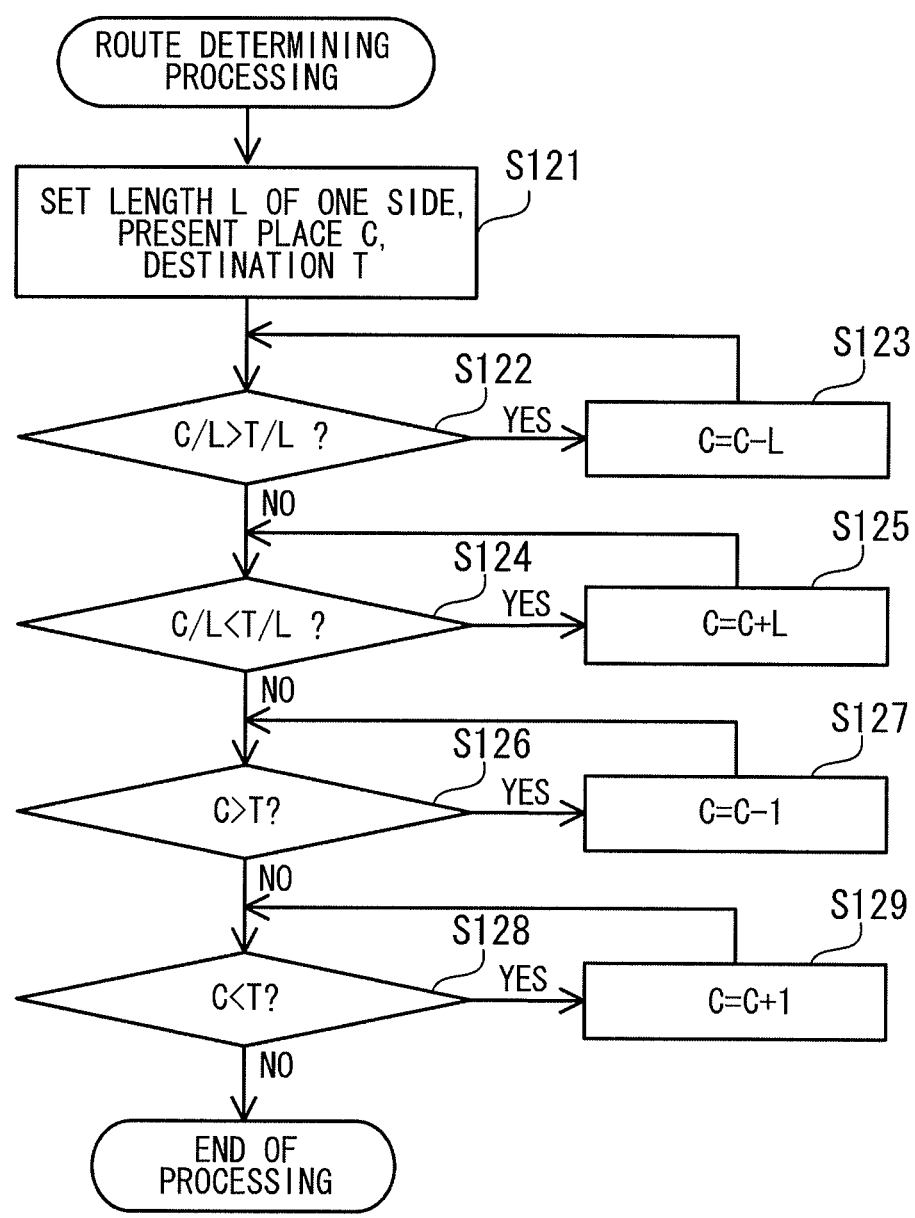
FIG. 8 is a flowchart showing an example of route determining processing.

FIG. 8 is a flowchart showing an example of route determining processing. A route determining method shown in FIG. 8 is an example of a routing algorithm applicable to the two-dimensional mesh type network shown in FIG. 6. A program implementing this routing algorithm is created in advance by a user and stored in the function design information storage unit 120. The processing of specifying the communication route according to the routing algorithm by the virtual communication specifying unit 161 will be described below along step numbers of FIG. 8.

[Step S121]
The virtual communication specifying unit 161 sets the one side length L, the present node number C and the destination node number T in the two-dimensional mesh type network. The transmission source node number is set as an initial value to the present node number C.

[Step S122]
The virtual communication specifying unit 161 judges whether the Y-coordinate of the present node is larger than the Y-coordinate of the destination node. That is, it is judged whether the condition that the value obtained by dividing the present node number C by the one side length L (the fractional parts are cut out, hereinafter similarly) is larger than the value obtained by dividing the destination node number T by one side length L is satisfied. If the condition concerned is satisfied, the processing goes to step S123. If the condition concerned is not satisfied, the processing goes to step S124.

[Step S123]
The virtual communication specifying unit 161 shifts the present node in the negative direction of the Y-axis by one. That is, it reduces the present node number C by the length L of one side. Thereafter, the processing goes to step S122.

[Step S124]
The virtual communication specifying unit 161 judges whether the Y-coordinate of the present node is smaller than the Y-coordinate of the destination node. That is, it judges whether the condition that the value obtained by dividing the present node number C by the one side length L is smaller than the value obtained by dividing the destination node number T by the one side length L is satisfied. When the condition concerned is satisfied, the processing goes to step S125. If the condition concerned is not satisfied, that is, when the Y-coordinate of the present node is identical to the Y-coordinate of the destination node, the processing goes to step S126.

[Step S125]
The virtual specifying unit 161 shifts the present node in the positive direction of the Y-axis by one. That is, it adds the present node number C with the length L of one side. Thereafter, the processing goes to step S124.

[Step S126]
The virtual communication specifying unit 161 judges whether the X-coordinate of the present node is larger than the X-coordinate of the destination node. That is, it judges whether the condition that the present node number C is larger than the destination node number T is satisfied. If the condition concerned is satisfied, the processing goes to step S127. If the condition concerned is not satisfied, the processing goes to step S128.

[Step S127]
The virtual communication specifying unit 161 shifts the present node in the negative direction of the X-axis by one. That is, it reduces the present node number C by only 1. Thereafter, the processing goes to step S126.

[Step S128]
The virtual communication specifying unit 161 judges whether the X-coordinate of the present node is smaller than the X-coordinate of the destination node. That is, it judges whether the condition that the present node number C is smaller than the destination node number T is satisfied. If the condition concerned is satisfied, the processing goes to step S129. If the condition is not satisfied, that is, when the present node and the destination node are identical to each other, the processing is finished.

[Step S129]
The virtual communication specifying unit 161 shifts the present node in the positive direction of the X-axis by one.

That is, it adds the present node number C with "1". Thereafter, the processing goes to step S128.

As described above, the virtual communication specifying unit 161 first shifts the present node so that the Y-coordinate of the present node is coincident with the Y-coordinate of the destination node. Thereafter, it shifts the present node so that the X-coordinate of the present node is coincident with the X-coordinate of the destination node. The route along which the present node tracks is set as a communication route.

Next, the processing executed in the simulation system having the construction and data structure as described above will be described in detail hereunder. The processing of outputting a message from the calculation node 200, the processing from accepting of a message to transferring of the message by the simulation server 100 and the processing of accepting a message by the calculation node 200 will be successively described in this order.

Figure 9:
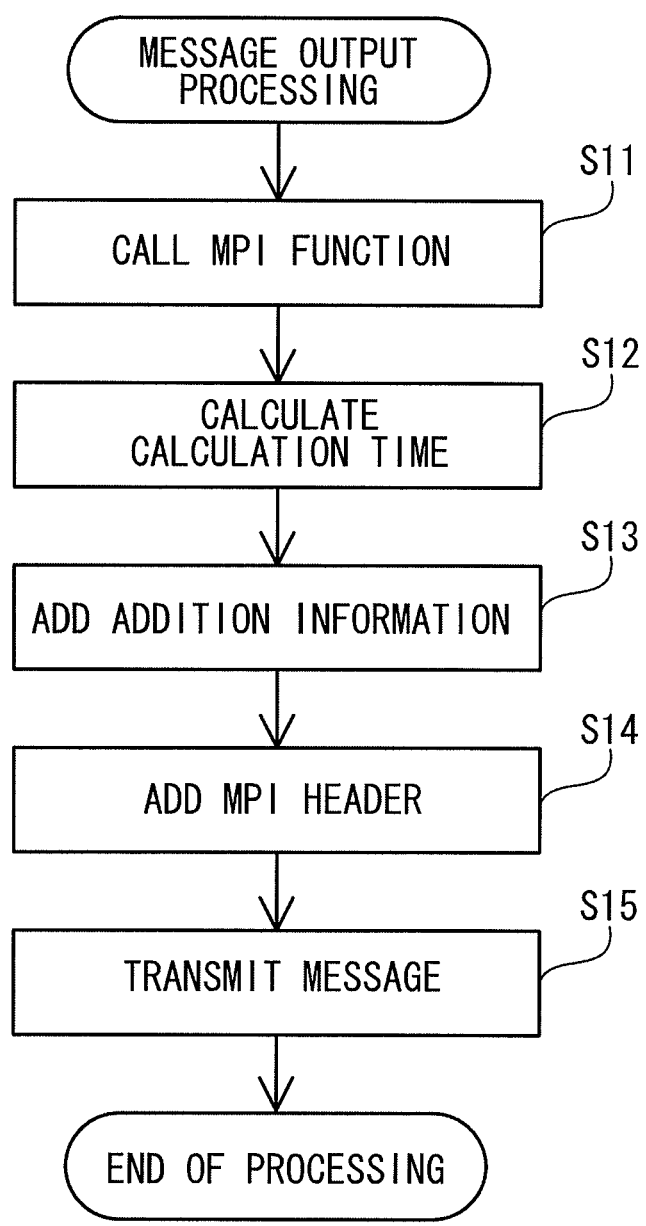
FIG. 9 is a flowchart showing the procedure of message output processing.

FIG. 9 is a flowchart showing the procedure of the message output processing. The processing shown in FIG. 9 will be described below along step numbers.

[Step S11]

When a communication with another process is required during execution of a process, the program executing unit 240 delivers communication data and a destination node number to the MPI command converter 230. This processing can be implemented as a calling of an MPI function provided by the MPI library.

[Step S12]

The MPI command converter 230 measures the lapse time from the time at which the MPI function is previously called, and sets the multiplication value of the measured lapse time and a predetermined coefficient as the calculation time. That is, the calculation time does not contain the time required for the communication. Here, the predetermined coefficient is a coefficient for converting the real time to the virtual time for the simulation. The virtual time is used in place of the real time to absorb the difference in calculation capability among the calculation nodes and establish the consistency between the calculation time and the communication time calculated by the simulation. The predetermined coefficient is preset for every calculation node.

[Step S13]

The MPI command converter 230 adds communication data with addition information. The addition information contains both the destination node number received from the program executing unit 240 and the calculation time calculated in step S12. The MPI command converter 230 delivers the data comprising the addition information and the communication data to the MPI communication unit 220.

[Step S14]

The MPI communication unit 220 further adds an MPI header to the data received from the MPI command converter 230. The MPI header contains the address of the simulation server 100 as the destination node number and the node number of the calculation node 200 as the transmission source node number.

[Step S15]

The MPI communication unit 220 outputs the data comprising the MPI header, the addition information and the communication data created in step S14 as a message to the network 20.

As described above, when the communication data is generated by the process being executed, the calculation node 200 adds the addition information and the MPI header to the communication data, and transmits the message to the simulation server 100, whereby the message is delivered to the simulation server 100.

Figure 10:
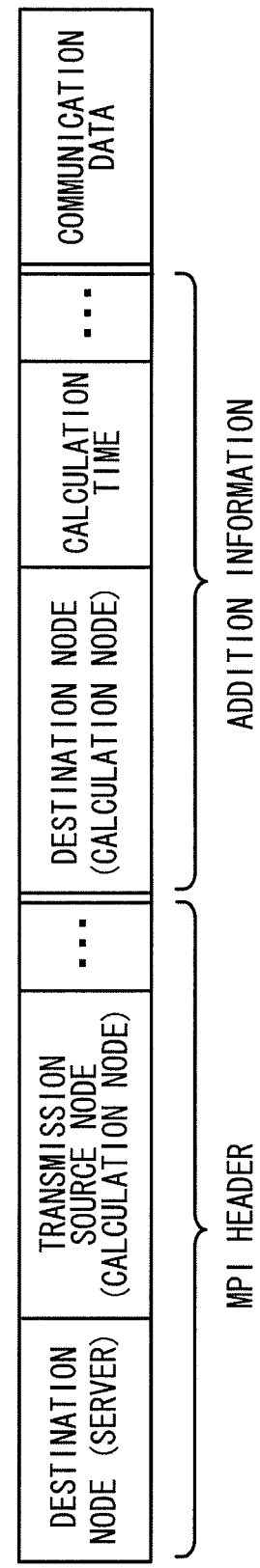
FIG. 10 is a diagram showing an example of the data structure of a message at the output time.

FIG. 10 is a diagram showing an example of the data structure of the message at the output time. The message shown in FIG. 10 is a message output from the calculation node 200 through the message output processing shown in FIG. 9. The MPI header is disposed at the head of the message. The addition information is disposed subsequent to the MPI header. The communication data is disposed at the end of the message.

The MPI header contains the address of the simulation server 100 as a direct destination of the message, and the node number of the calculation node 200 as the transmission source node. The MPI header is information required to deliver the message to the simulation server 100 through the network 20. The addition information contains the node number of the original destination node, and the calculation time (virtual time) required from the previous communication in the calculation node 200.

The processing of outputting the message by the calculation node 200 is described. However, the same is applied to the processing of outputting a message by each of the other calculation nodes 200a, ..., 200g.

Figure 11:
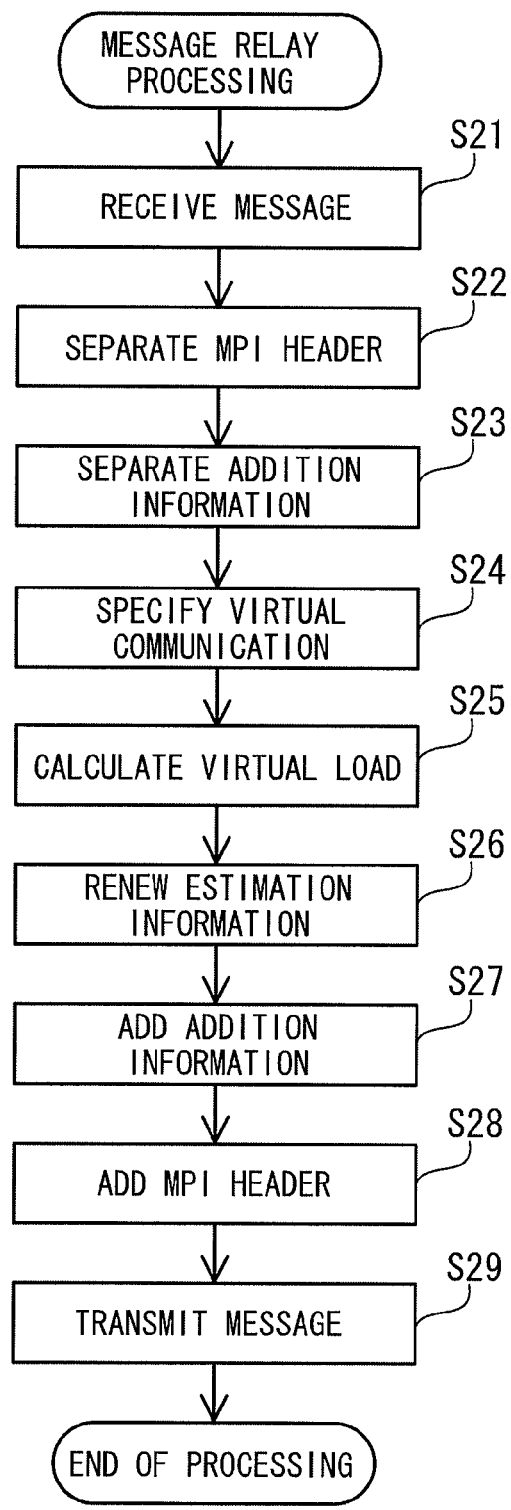
FIG. 11 is a flowchart showing the procedure of message relay processing.

FIG. 11 is a flowchart showing the procedure of the message relay processing. The processing shown in FIG. 11 will be described below along the step numbers.

[Step S21]

The MPI communication unit 140 receives a message output from the calculation nodes 200, 200a, ..., 200g.

[Step S22]

The MPI communication unit 140 separates the MPI header from the message received in step S21. Then, the MPI communication unit 140 delivers the data comprising the addition information and the communication data and the transmission source node number contained in the MPI header to the MPI command converter 150.

[Step S23]

The MPI command converter 150 further separates the addition information from the data received from the MPI communication unit 140. Then, the MPI command converter 150 delivers the communication data, the destination node number and the calculation time contained in the addition information, and the transmission source node number received from the MPI communication unit 140 to the simulation unit 160.

[Step S24]

The simulation unit 160 delivers the data received from the MPI command converter 150 to the virtual communication specifying unit 161. The virtual communication specifying unit 161 refers to the design information stored in the physical design information storage unit 110 and the function design information storage unit 120 to specify a virtual communication content. Specifically, the virtual communication specifying unit 161 specifies the communication occurrence timing on the basis of the calculation time and the communication time which have been accumulated till now and the newly received calculation time. Furthermore, the virtual communication specifying unit 161 specifies the communication route on the basis of the transmission's source node number and the destination node number.

[Step S25]

The virtual load calculator 162 calculates the virtual load state of each link at each timing on the basis of the virtual communication content specified by the virtual communication specifying unit 161 in step S24. For example, the virtual load calculator 162 calculates the communication condition of the link, the amount of communication data which waits for transmission due to conflict, etc. Furthermore, the virtual load calculator 162 calculates the communication time corresponding to the virtual communication content specified by the virtual communication specifying unit 161.

[Step S26]

The virtual load calculator 162 renews the estimation information stored in the estimation information storage unit 130 in accordance with the virtual load state calculated in step S25. For example, the virtual load calculator 162 renews the operation rate of each link, the average length of each communication buffer, etc. Thereafter, the virtual load calculator 162 delivers the communication time calculated in step S25 to the simulation unit 160. The simulation unit 160 delivers the total of the calculation time and the communication time, the communication data, the destination node number and the transmission source node number to the MPI command converter 150.

[Step S27]

The MPI command converter 150 adds the addition information to the communication data. The addition information contains the total of the calculation time and the communication time and the transmission source number which are received from the simulation unit 160. The MPI command converter 150 delivers the data comprising the addition information and the communication data to the MPI communication unit 140.

[Step S28]

The MPI communication unit 140 further adds the data received from the MPI command converter 150 with the MPI header. The MPI header contains the destination node number received from the simulation unit 160 and the address of the simulation sever 100 as the transmission source node number.

[Step S29]

The MPI communication unit 140 outputs the data comprising the MPI header, the addition information and the communication data created in step S28 as a message to the network 20.

As described above, when receiving the message from the calculation nodes 200, 200a, ..., 200g, the simulation server 100 executes a communication simulation by using the transmission source node number, the node number of the original destination node, the virtual calculation time and the communication data. The simulation server 100 adds the communication data with the addition information and the MPI header, and transmits them to the original destination node, whereby the message is delivered to the original destination node.

Figure 12:
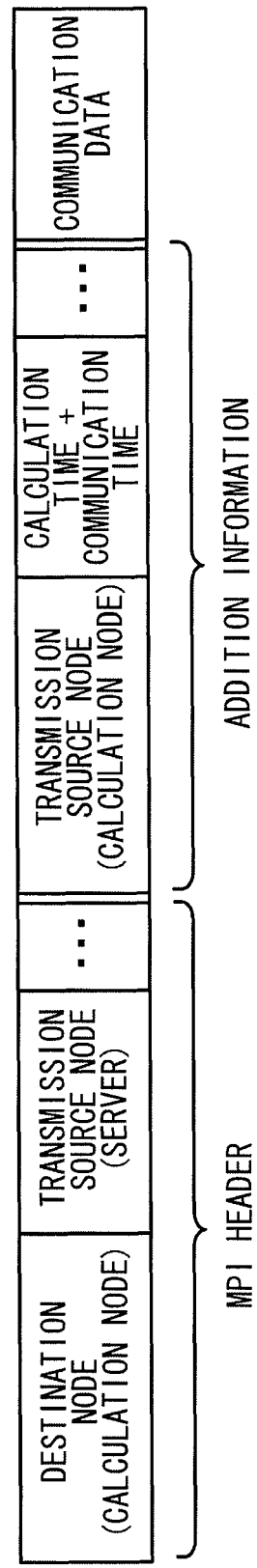
FIG. 12 is a diagram showing an example of the data structure of a message at the relay time.

FIG. 12 is a diagram showing an example of the data structure of a message at the relay time. The message shown in FIG. 12 is a message output from the simulation server 100 through the message relay processing shown in FIG. 11. The MPI header is disposed at the head of the message. Addition information is disposed subsequently to the MPI header. Communication data is disposed at the end of the message.

The MPI header contains the node number of the destination node and the node number of the simulation server 100 as the transmission source node. The MPI header is information required to deliver the message through the network 20 to the destination node. The addition information contains the node number of the original transmission source node and the total time of the calculation time (virtual time) required in the transmission source node and the communication time (virtual time) calculated by the simulation.

Figure 13:
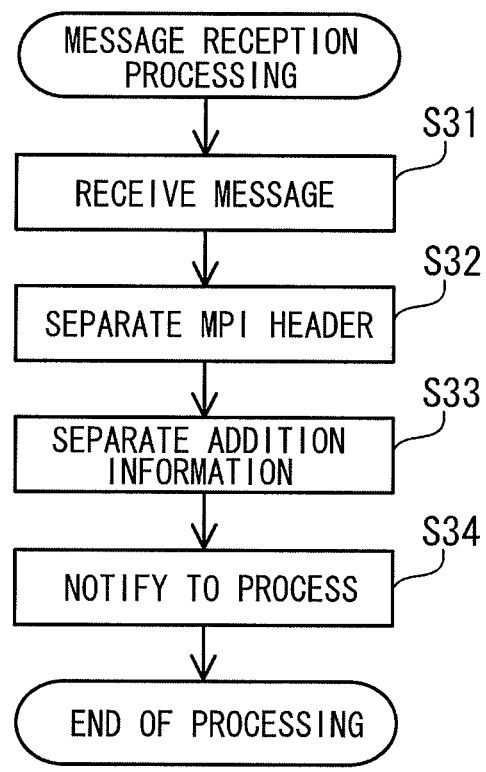
FIG. 13 is a flowchart showing the procedure of message accept processing.

FIG. 13 is a flowchart showing the procedure of the message reception processing. The processing shown in FIG. 13 will be described hereunder along step numbers.

[Step S31]

The MPI communication unit 220 receives a message output from the simulation server 100.

[Step S32]

The MPI communication unit 220 separates the MPI header from the message received in step S31. The MPI communication unit 220 delivers the data comprising the addition information and the communication data to the MPI command converter 230.

[Step S33]

The MPI command converter 230 further separates the addition information from the data received from the MPI communication unit 220. The MPI command converter 230 delivers the communication data to the program executing unit 240.

[Step S34]

When receiving the communication data from the MPI command converter 230, the program executing unit 240 notifies the reception of the communication data to the process being executed. Subsequently, the process can use the communication data.

As described above, when receiving the message from the simulation server 100, the calculation node 200 extracts the communication data contained in the message and notifies it of the process being executed. Here, if the information contained in the MPI header and the addition information is stored in RAM or the like, the process being executed can use this information. Furthermore, the manager of the calculation node 200 can use this information after the simulation is finished. The processing of accepting the message by the calculation node 200 is described above. However, the same is applied to the processing of accepting the message by another of the calculation nodes 200a, ..., 200g.

Here, this operation is viewed from the process so that the process directly transmits/receives the communication data with another process without passing through the simulation server 100. Accordingly, the parallel program which is actually used in the parallel computing machine can be disposed in the calculation nodes 200, 200a, ..., 200g, and it is unnecessary to dispose a program prepared for the simulation.

Next, an example of an estimation result obtained through the simulation and a display example of the estimation result will be described.

FIG. 14 is a diagram showing an example of the data structure of the estimation information table. The estimation information table 131 shown in FIG. 14 is stored in the estimation information storage unit 130 of the simulation server 100. The estimation information stored in the estimation information table 131 is an estimation result of the two-dimensional mesh type network shown in FIG. 6.

The estimation information table 131 is provided with the item indicating the node, the item indicating the calculation time, the item indicating the port number, the item indicating the buffer maximum length, the item indicating the buffer average length, the item indicating the operation rate and the item indicating the average delay. The information pieces of the respective items arranged in the lateral direction are associated with one another.

The node number of a node serving as a link starting point is set as the item indicating the node. The accumulated calculation time of the node serving as the starting point is set as the item indicating the calculation time. The unit of the calculation time is "second". This calculation time is a virtual time as described above. In the case of the node corresponding to the router, the item indicating the calculation time is blank. The port number indicating the direction of the link when viewed from the node serving as the starting time is set as the item indicating the port number.

The maximum value of the amount of communication data stored in the communication buffer, that is, the maximum value of the amount of the communication data which waits for transmission in front of the link is set as the item indicating the buffer maximum length. The average value of the amount of the communication data stored in the communication buffer over the whole simulation time is set at the item indicating the buffer average length. The units of the buffer maximum length and the buffer average length are "byte".

The rate of the link using time to the whole simulation time is set as the item indicating the operation rate. The average value of the delay time when a signal is transmitted from the node serving as the link starting point to the node serving as the link end point is set as the item indicating the average delay. The unit of the average delay is "ns (nano second)".

The estimation information stored in the estimation information table 131 is properly renewed by the virtual load calculator 162 of the simulation server 100. For example, information in which the node is "0", the calculation time is "100", the port number is "0", the buffer maximum length is "8", the buffer average length is "2", the operation rate is "21%" and the average delay is "10" is stored. This indicates that the link from the calculation node having the node number "0" to the router having the node number "1" has the operation rate of 21% and the average delay time of 10 ns and the communication data of 8 bytes in maximum and 2 bytes in average are trapped in front of the link.

Figure 15:
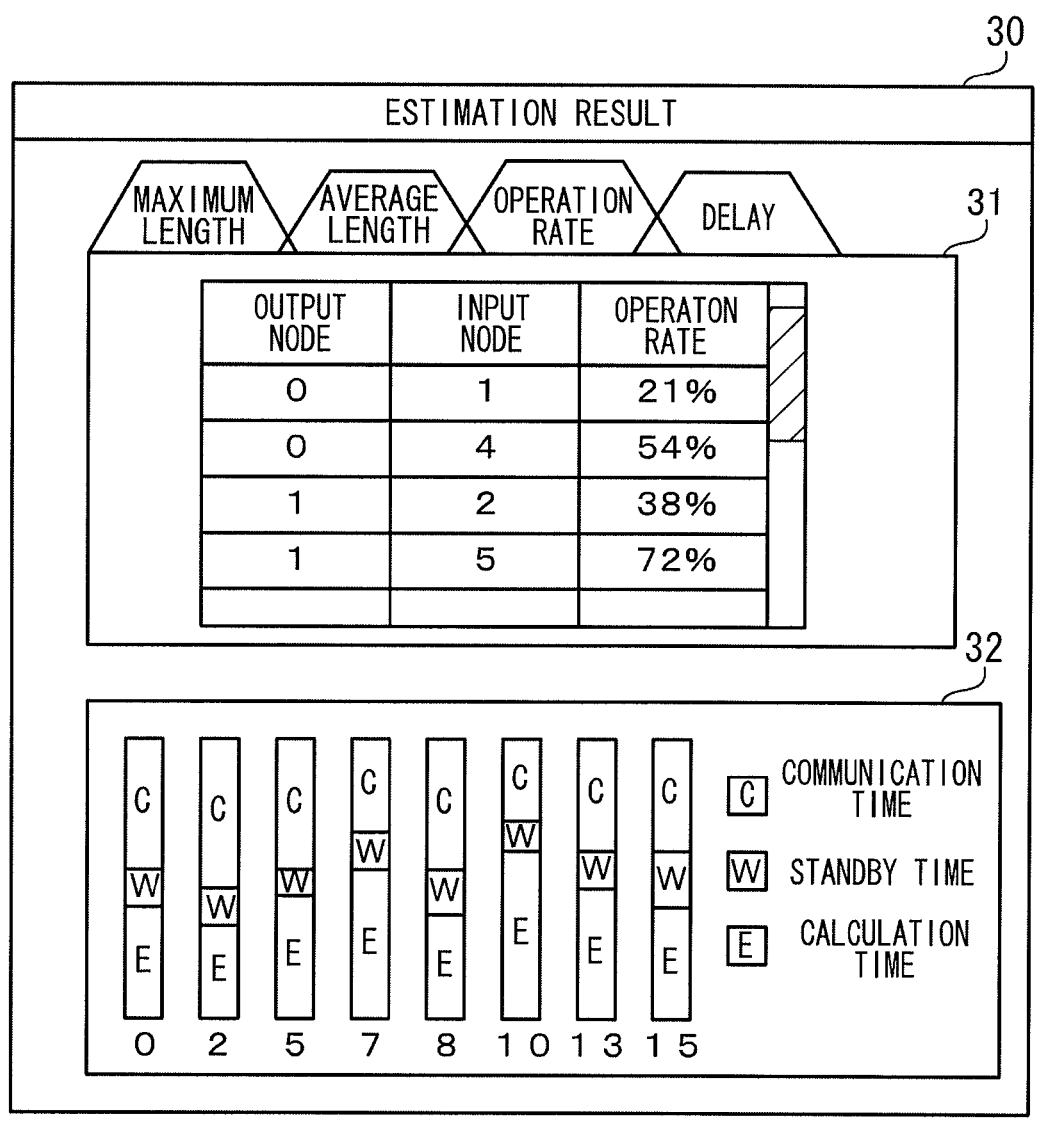
FIG. 15 is a diagram showing an example of a display screen of an estimation result.

FIG. 15 is a diagram showing an example of a display screen of the estimation result. The display screen 30 shown in FIG. 15 is displayed on the monitor 11 by the estimation result display unit 170 of the simulation server 100. The display screen 30 has a statistical value display area 31 and a graphic display area 32.

Various types of statistical values as an estimation result are tabled and displayed in the statistical value display area 31. In the statistical value display area 31, a tab is provided for every statistical-value type, and when a user selects one tab, the statistical value of the type corresponding to the selected tab is displayed.

A bar graph representing the rates of the calculation time, the communication time and the standby time of each calculation node is displayed in the graphic display area 32. The accumulated communication time can be calculated on the basis of the operation rate of each link, etc. The standby time is a time required to wait until the communication data are received from another calculation node after the communication data are output. The accumulated standby time can be calculated by excluding the accumulated calculation time and the accumulated communication time from the overall simulation time.

By using the simulation system as described above, the calculation node of the parallel computing machine can be implemented by an actual computer and a parallel program, and only the network can be virtually implemented by the simulation server. Therefore, as compared with a case where all the constituent elements of the parallel computing machine are implemented by simulation programs, the amount of work in preparing for the simulation can be greatly reduced.

Furthermore, the time required for the simulation can be greatly shortened. Furthermore, the accurate estimation result which is matched with the timing of the actually occurring communication can be obtained. Furthermore, the simulation can be performed on a real-time basis without using any intermediate data such as a communication log or the like, so that it is not required to hold an enormous quantity of data.

Accordingly, even when the performance estimation of plural kinds of networks is carried out, the estimation result of each network can be obtained quickly and easily, and the design of the network of the parallel computing machine can be facilitated.

Second Embodiment

Next, a second embodiment will be described. The different point from the first embodiment will be mainly described, and the description of the same matters is omitted.

Figure 16:
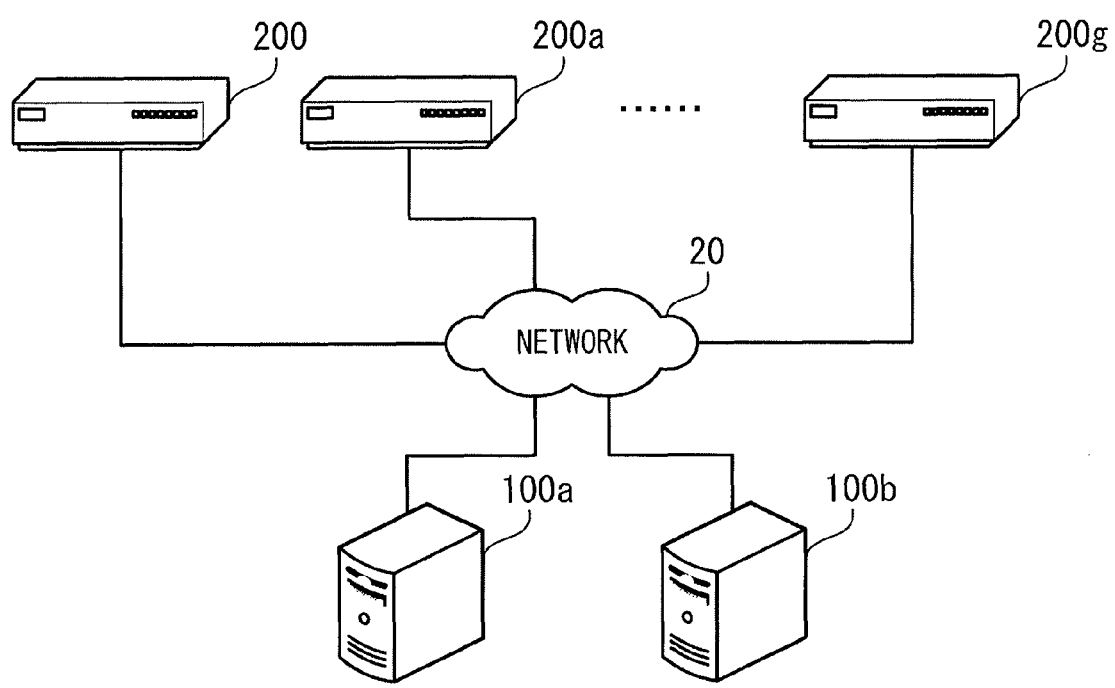
FIG. 16 is a diagram showing a system construction according to a second embodiment.

FIG. 16 is a diagram showing the system construction of the second embodiment. The simulation system shown in FIG. 16 is constructed by simulation servers 100a, 100b and eight calculation nodes 200, 200a, . . . , 200g and the network 20. The simulation servers 100a, 100b and the calculation nodes 200, 200a, . . . , 200g can mutually communicate with one another through the network 20.

The simulation servers 100a, 100b are server computers for executing a simulation to estimate the network performance of the parallel computing machine as in the case of the simulation server 100 of the first embodiment. However, in the second embodiment, the two simulation servers 100a, 100b execute a simulation while distributing the simulation.

That is, the two simulation servers 100a and 100b receive messages output from the eight calculation nodes 200, 200a, . . . , 200g while sharing the reception work. For example, the simulation server 100a receives the messages output from four calculation nodes of the calculation nodes 200, 200a, . . . , 200g while the other simulation server 100b receives the messages output from the other four calculation nodes.

Here, the procedure of the simulation executed by the simulation servers 100a, 100b is basically identical to that of the simulation server 100 of the first embodiment. However, it is required to make communications between the two simulation servers 100a, 100b to properly synchronize the content of the simulation. Particularly, in order to prevent the inconsistency in which the simulation proceeds although the communication content to be processed is not processed, it is required to synchronize the virtual lapse time in the simulation.

A simulation which is distributed and executed while synchronization is established among simulation programs is called a distributed simulation. A parallel discrete event simulation (PDES) is known as an example of the technique of the distributed simulation. By using a synchronizing method such as PDES or the like, the distributed simulation based on the two simulation servers 100a, 100b can be implemented.

By using the simulation system as described above, the same effect as the first embodiment can be obtained. Furthermore, by using the simulation system of the second embodiment, the load of the simulation can be distributed. Accordingly, this embodiment also can be quickly adapted to the simulation of the large-scale parallel computing machine having a large number of calculation nodes.

In the second embodiment, the two simulation servers are used. However, three or more simulation servers may be used.

Third Embodiment

Next, a third embodiment will be described. The different point from the first embodiment will be mainly described hereunder, and the description of the same matters is omitted.

Figure 17:
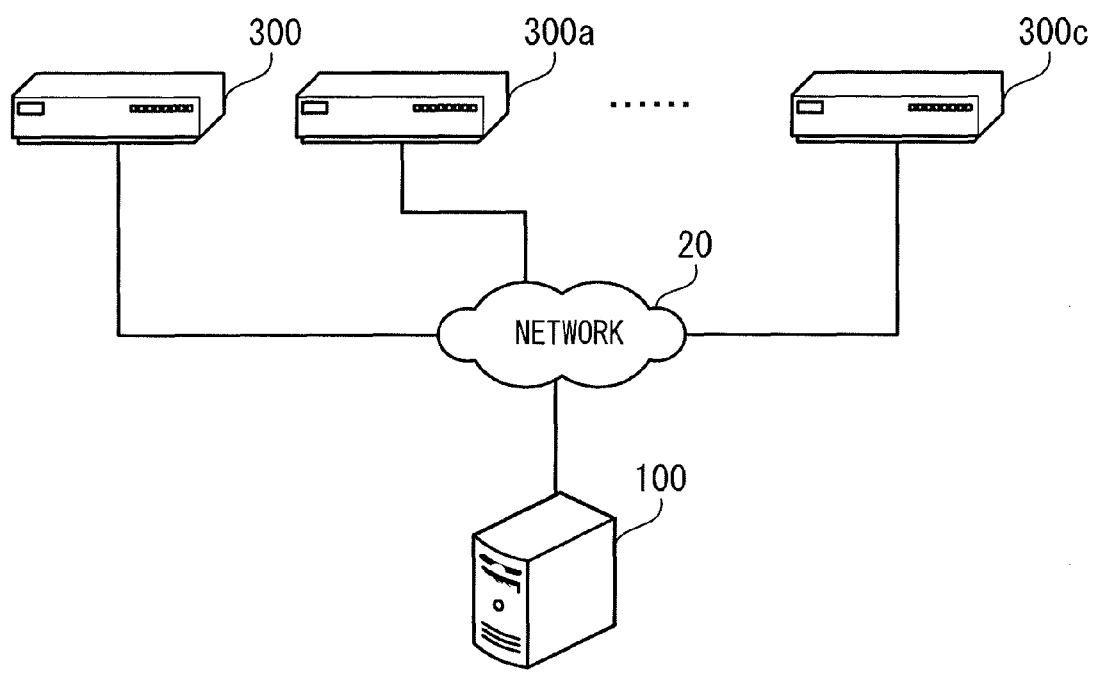
FIG. 17 is a diagram showing a system construction according to a third embodiment.

FIG. 17 is a diagram showing the system construction of the third embodiment. The simulation system shown in FIG. 17 is constructed of the simulation server 100, four calculation nodes 300, 300a, . . . , 300c and the network 20. The simulation server 100 and the calculation nodes 300, 300a, . . . , 300c can mutually communicate with one another through the network 20.

The calculation nodes 300, 300a, . . . , 300c are computers executing processes as in the case of the calculation nodes 200, 200a, . . . , 200g of the first embodiment. However, in the third embodiment, each calculation node executes two processes time-divisionally.

Figure 18:
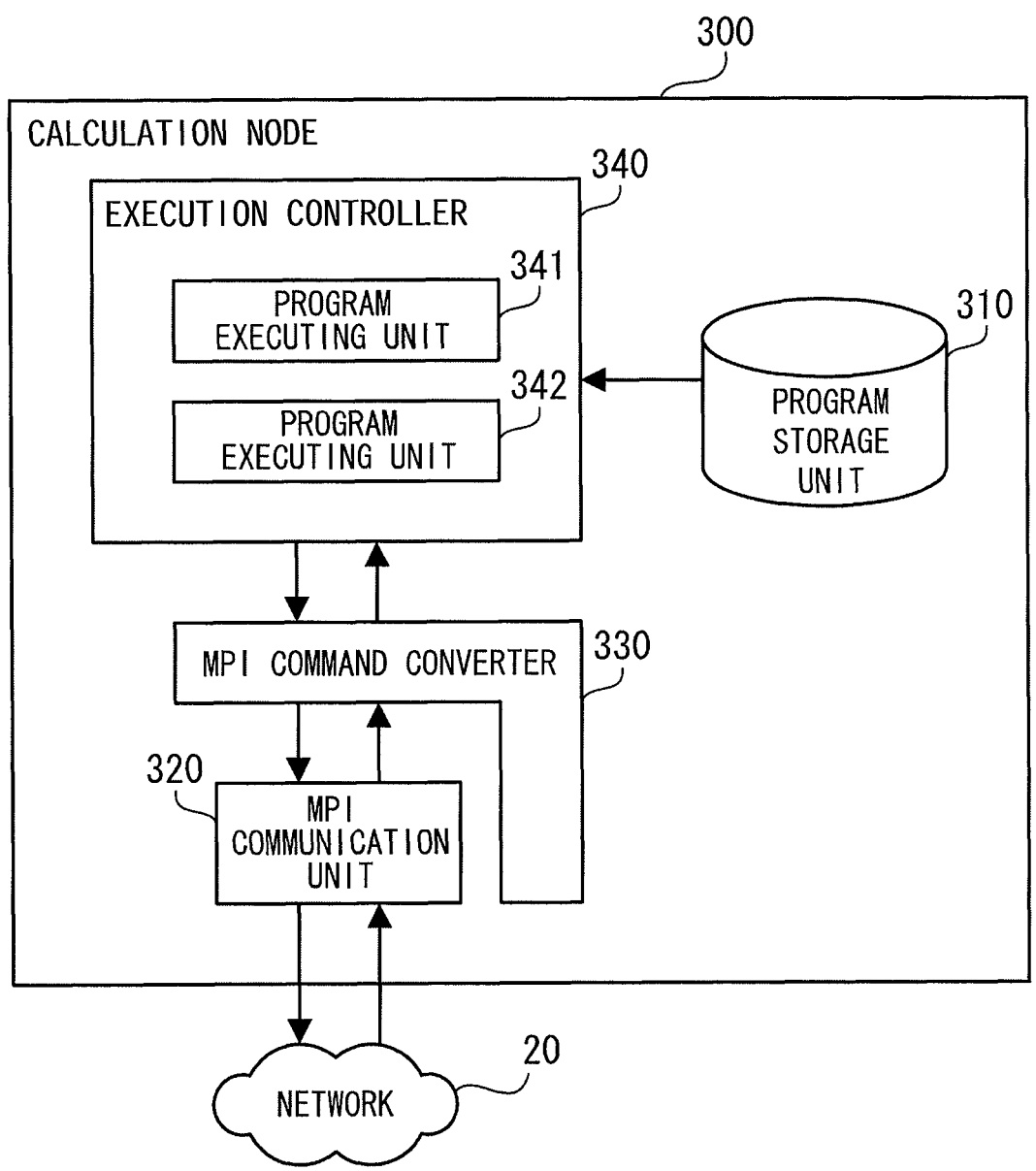
FIG. 18 is a block diagram showing the function of a calculation node according to a third embodiment.

FIG. 18 is a block diagram showing the function of the calculation node of the third embodiment. The calculation node 300 has a program storage unit 310, an MPI communication unit 320, an MPI command converter 330 and an execution controller 340.

The execution controller 340 has program executing units 341 and 342. The execution controller 340 obtains a parallel program from the program storage unit 310 when start of the processing is instructed. Then, the executing controller 340 makes the program executing units 341 and 342 execute the respective processes on the basis of the obtained parallel program. The two processes are time-divisionally executed by one CPU.

Here, node numbers are individually allocated to the program executing units 341 and 342. This is because the function to be originally implemented by the two calculation nodes is implemented by one calculation node.

The functions of the program storage unit 310, the MPI communication unit 320 and the MPI command converter 330 are basically identical to those of the program storage unit 210, the MPI communication unit 220 and the MPI command converter 230 of the first embodiment shown in FIG. 5.

However, the MPI command converter 330 judges on the basis of the destination node number which one of the program executing units 341, 342 the communication data contained in the message should be delivered to. Furthermore, when calculating the calculation time, the MPI command converter 330 calculates the substantial calculation time of each process in consideration of the time-divisional execution of the two processes. For example, the MPI command converter 330 sets the multiplication value of the half of the actual lapse time and a predetermined coefficient as the calculation time of each process.

The calculation nodes 300a, . . . , 300c may be also implemented by the same module construction as the calculation node 300.

By using the simulation system as described above, the same effect as the first embodiment can be obtained. Furthermore, by using the simulation system of the third embodiment, the simulation can be executed by using computers whose number is smaller than the number of calculation nodes in design. Accordingly, the work load of the simulation of a large-scale parallel computing machine having a large calculation node number can be reduced.

In the third embodiment, the two processes are executed in each calculation node, however, three or more processes may be executed in each calculation node.

Fourth Embodiment

Next, a fourth embodiment will be described. The different point from the first embodiment will be mainly described, and the description of the same matters is omitted.

Figure 19:
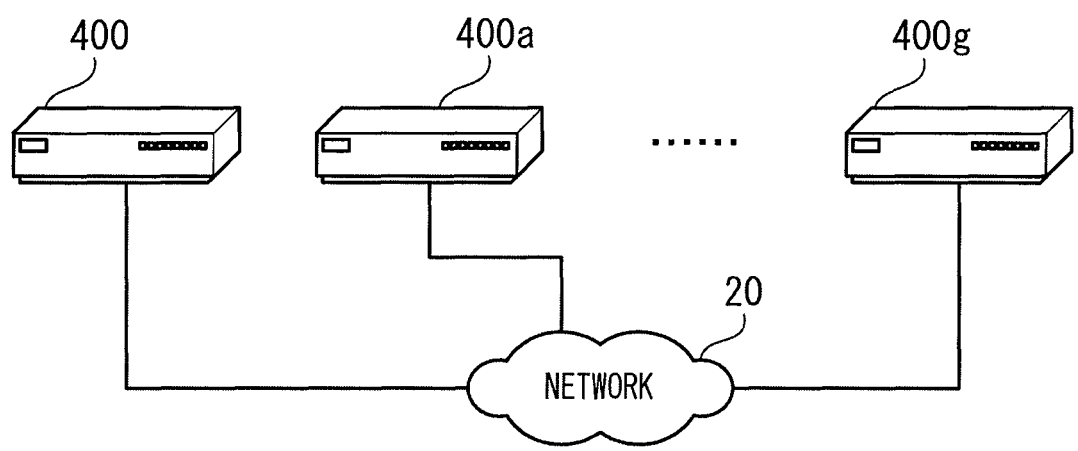
FIG. 19 is a diagram showing a system construction according to a fourth embodiment.

FIG. 19 is a diagram showing the system construction of the fourth embodiment. The simulation system shown in FIG. 19 is constructed by eight calculation nodes 400, 400a, . . . , 400g and the network 20. The calculation nodes 400, 400a, . . . , 400g can mutually communicate with one another through the network 20.

The calculation nodes 400, 400a, . . . , 400g are computers for executing respective processes and also executing a simulation for estimating the network performance while sharing the simulation. That is, the number of simulation servers of the second embodiment is set to be equal to the number of the calculation nodes, and the function performed by each simulation server is implemented on each calculation node.

Figure 20:
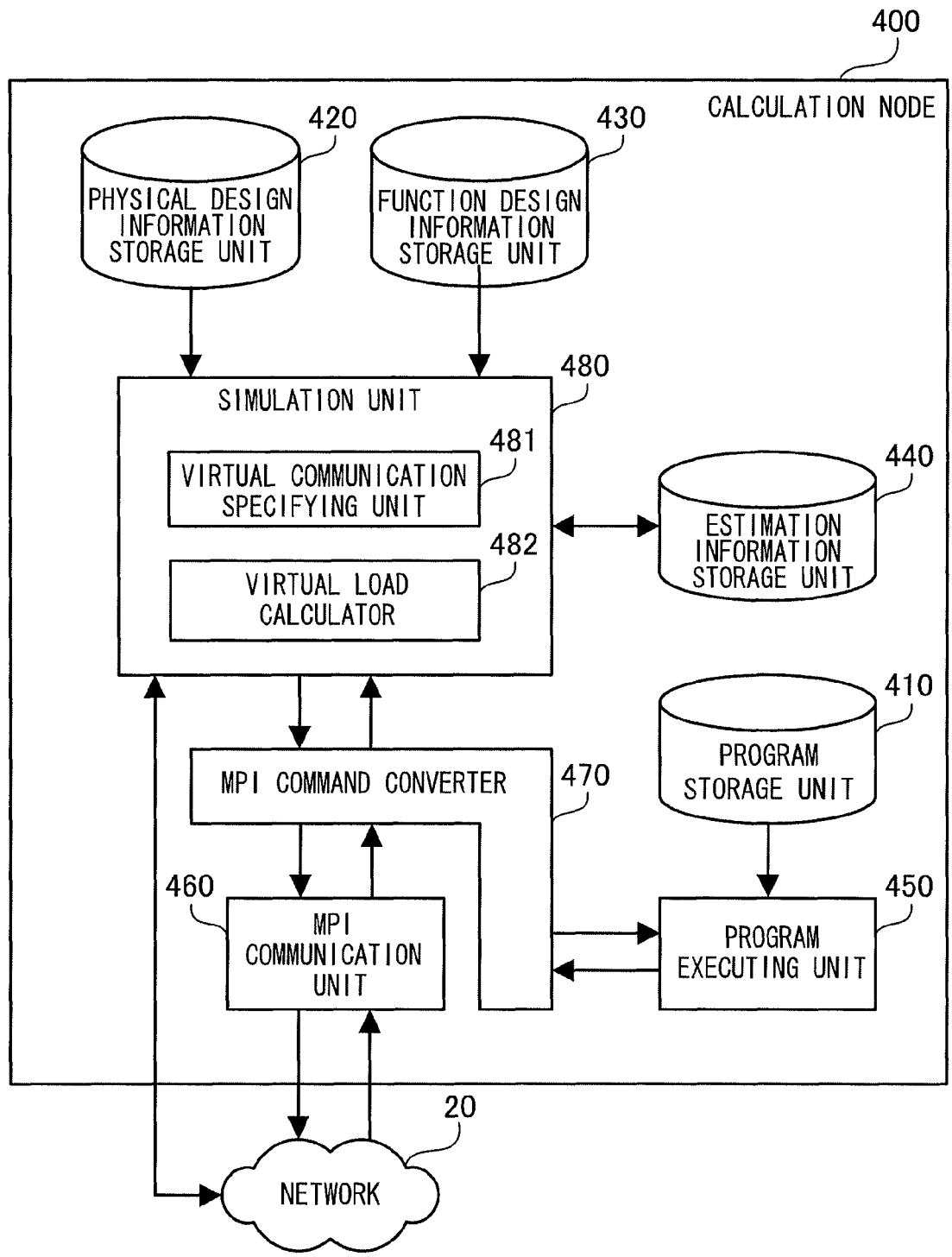
FIG. 20 is a block diagram showing the function of a calculation node according to the fourth embodiment.

FIG. 20 is a block diagram showing the function of the calculation node of the fourth embodiment. The calculation node 400 has a program storage unit 410, a physical design information storage unit 420, a function design information storage unit 430, an estimation information storage unit 440, a program executing unit 450, an MPI communication unit 460, an MPI command converter 470 and a simulation unit 480.

The MPI command converter 470 relays data among the program executing unit 450, the MPI communication unit 460 and the simulation unit 480. Specifically, when receiving from the MPI communication unit 460 a message from which the MPI header is separated, the MPI command converter 470 further separates the addition information therefrom, and delivers it to the program execution unit 450. Furthermore, when receiving communication data from the program executing unit 450, the MPI command converter 470 delivers the communication data to the simulation unit 480. Thereafter, when receiving communication data from the simulation unit 480, the MPI command converter 470 adds the addition information to the communication data concerned and delivers it to the MPI communication unit 460.

The functions of the program storage unit 410 and the program executing unit 450 are identical to those of the program storage unit 210 and the program executing unit 240 of the first embodiment shown in FIG. 5. The functions of the physical design information storage unit 420, the function design information storage unit 430, the estimation information storage unit 440, the MPI communication unit 460 and the simulation unit 480 are basically identical to those of the physical design information storage unit 110, the function design information storage unit 120, the estimation information storage unit 130, the MPI communication unit 140 and the simulation unit 160 of the first embodiment shown in FIG. 4.

However, the simulation unit 480 communicates with the calculation nodes 400a, . . . , 400g through the network 20, and properly synchronizes the content of the simulation. That is, as described with reference to the second embodiment, the virtual lapse time, etc. in the simulation are synchronized by using the synchronizing method such as PDES or the like.

The calculation nodes 400a, . . . , 400g can be implemented by the same module construction as the calculation node 400.

Next, the processing of outputting the message by the calculation node 400 will be described.

Figure 21:
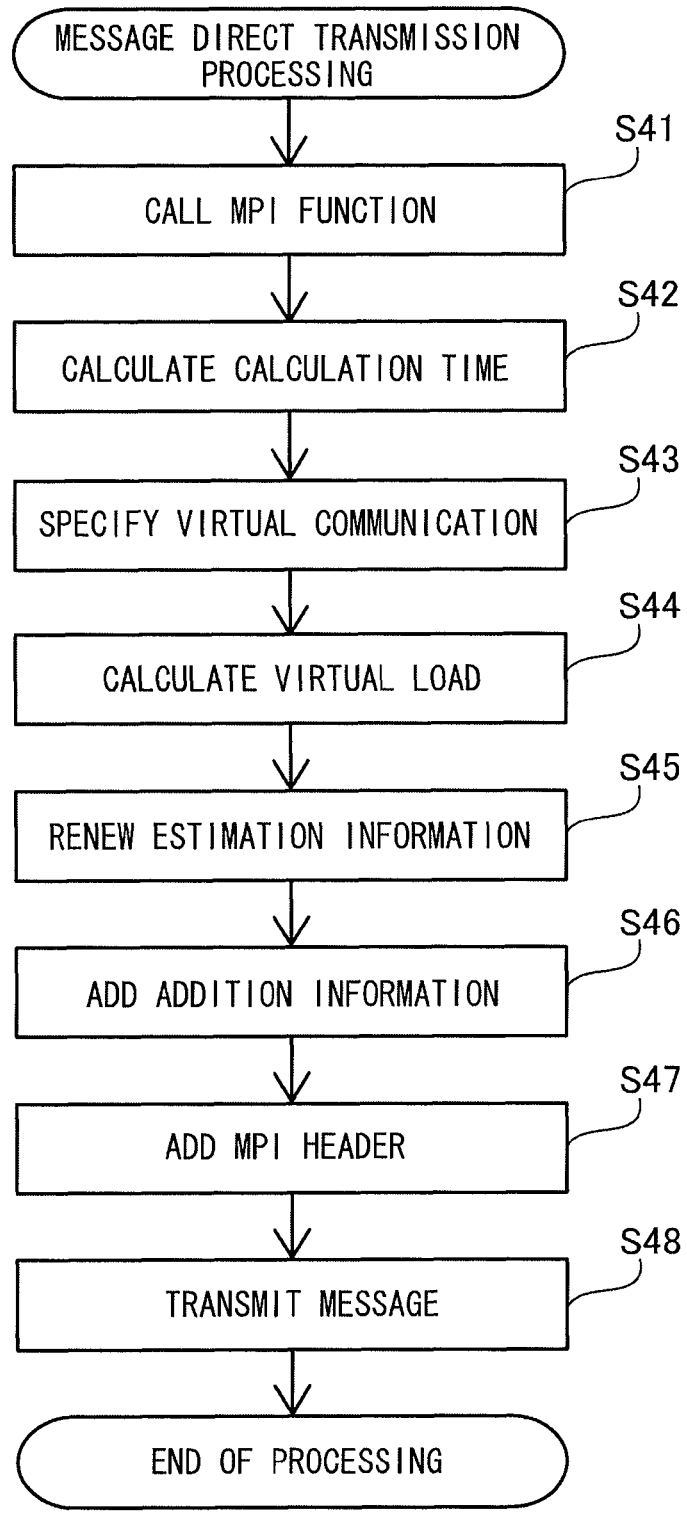
FIG. 21 is a flowchart showing the procedure of message direct transmission processing.

FIG. 21 is a flowchart showing the procedure of the message direct transmission processing. The processing shown in FIG. 21 will be described below along step numbers.

[Step S41]

The program executing unit 450 delivers communication data and a destination node number to the MPI command converter 470 when it is required to communicate with another process during execution of a process.

[Step S42]

The MPI command converter 470 measures the lapse time from the time when a previous MPI function is called, and sets the multiplication value of the measured lapse time and a predetermined coefficient as a calculation time. Then, the MPI command converter 470 delivers the communication data, the destination node number and the calculation time to the simulation unit 480.

[Step S43]

The simulation unit 480 delivers the data received from the MPI command converter 470 to the virtual communication specifying unit 481. The virtual communication specifying unit 481 refers to design information stored in the physical design information storage unit 110 and the function design information storage unit 120 to specify a virtual communication content. The transmission source node number used when the communication content is specified as the node number allocated to the calculation node 400.

[Step S44]

The virtual load calculator 482 calculates the virtual load state of each link at each timing on the basis of the virtual communication content specified by the virtual communication specifying unit 481 in step S43. Furthermore, the virtual load calculator 482 calculates the communication time corresponding to the virtual communication content specified by the virtual communication specifying unit 481.

[Step S45]

The virtual load calculator 482 renews the estimation information stored in the estimation information storage unit 440 in accordance with the virtual load state calculated in step S44. Thereafter, the virtual load calculator 482 delivers the communication time calculated in step S44 to the simulation unit 480. The simulation unit 480 delivers the total of the calculation time and the communication time to the MPI command converter 470.

[Step S46]

The MPI command converter 470 adds the communication data with the addition information. The addition information contains the total of the calculation time and the communication time received from the simulation unit 480. The MPI command converter 470 delivers the data comprising the addition information and the communication data and the destination node number received from the program executing unit 450 to the MPI communication unit 460.

[Step S47]

The MPI communication unit 460 further adds the MPI header to the data received from the MPI command converter 470. The MPI header contains the destination node number received from the MPI command converter 470 and the node number of the calculation node 400 as the transmission source node number.

[Step S48]

The MPI communication unit 460 outputs the data comprising the MPI header, the addition information and the communication data created in step S47 as a message to the network 20.

When the communication data is generated by the process being executed as described above, the calculation node 400 first executes a communication simulation. Thereafter, the addition information and the MPI header are added to the communication data and then a message to the destination node is transmitted.

Figure 22:
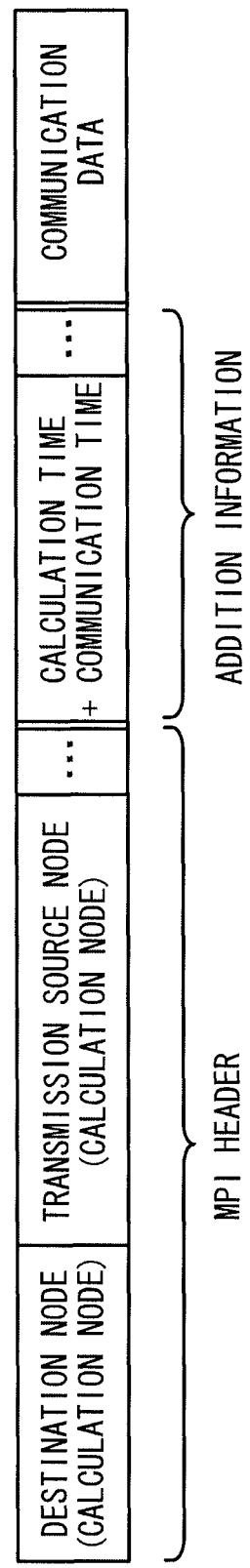
FIG. 22 is a diagram showing an example of the data structure of a message at the direct transmission time.

FIG. 22 is a diagram showing an example of the data structure of a message at the direct transmission time. The message shown in FIG. 22 is the message output from the calculation node 400 through the message direct transmission processing shown in FIG. 21. An MPI header is disposed at the head of the message. Addition information is disposed subsequently to the MPI header. Communication data is disposed at the end of the message.

The MPI header contains the node number of a destination node and the node number of the calculation node 400 as a transmission source node. The MPI header is information necessary to deliver a message through the network 20 to the destination node. The addition information contains a calculation time (virtual time) required from the previous communication by the calculation node 400.

By using the simulation system as described above, the same effect as the first embodiment can be obtained. Furthermore, by using the simulation system of the fourth embodiment, the load of the simulation can be distributed, and thus the simulation of a large-scale parallel computing machine can be quickly performed. Furthermore, it is unnecessary to prepare for simulation servers individually, and the simulation can be executed by the minimum number of computers required for the parallel computing machine.

In this embodiment, the message is transmitted/received on the basis of the specification of MPI, however, the message may be transmitted/received by using other communication methods.

Furthermore, in this embodiment, with respect to the calculation time, the processing of converting the real-time to the virtual time is executed at the calculation node side, however, it may be executed at the simulation server side. In this case, the message transmitted from the calculation node to the simulation server contains the real-time based calculation time.

Still furthermore, in this embodiment, the calculation time of the calculation node is calculated by using the calling interval of the MPI function, however, the calculation time may be calculated by other methods. For example, the calculation time may be calculated by monitoring the allocation condition of CPU to each process.

The network performance estimating program, the network performance estimating device and the network performance estimating method according to the present invention have been described on the basis of the embodiments shown in the figures. However, the present invention is not limited to these embodiments, and the construction of each part may be replaced by any construction having the same function. Furthermore, any other constituent elements or steps may be added to the present invention, and the constructions (features) of any two or more embodiments described above may be combined.

The processing function described above may be implemented by a computer. In this case, there is provided a program describing the processing content of the function to be performed by each of the respective simulation servers and the respective calculation nodes. By executing the program concerned in a computer, the processing function concerned can be implemented on the computer. The program describing the processing content may be recorded in a computer-readable recording medium. A magnetic recording device, an optical disc, an magneto-optical recording medium, a semiconductor memory or the like may be used as a computer-readable recording medium. A hard disk (HDD), a flexile disk (FD), a magnetic tape (MT) or the like may be used as the magnetic recording device. DVD (Digital Versatile Disc), DVD-RAM, CD-ROM (Compact Disc-Read Only Memory), CD-R (Recordable)/RW (Rewritable) or the like may be used as the optical disc. MO (Magneto-Optical disk) or the like may be used as the magneto-optical recording medium.

When the program is distributed, a portable recording medium such as DVD, CD-ROM or the like in which the program is recorded is sold. Furthermore, it may be possible to store the program in a storage device of a server computer and transfer the program concerned from the server computer to another computer through a network.

A computer executing the program stores, for example, the program recorded in a portable recording medium or transferred from a server computer into its own storage device. Then, the computer reads out the program from its own storage device and executes the processing based on the program. The computer may directly read out the program from the portable recording medium and execute the processing based on the program. Still furthermore, the computer may successively execute the processing based on the received program every time the program is transferred from the server computer.

The invention claimed is:

1. A network performance estimating device for estimating network performance of a parallel computing machine comprising:
   a plurality of calculation nodes that execute a plurality of processes in parallel, wherein each calculation node of the plurality of calculation nodes is connected to the network performance estimating device, and wherein each of the plurality of processes communicates with another process in another calculation node of the plurality of calculation nodes;
   a memory configured to store design information defining a simulation target network including a plurality of simulation target calculation nodes; and
   a processor configured to execute a process including:
   obtaining one or more message passing interface (MPI) packets, including communication data output, from one of the plurality of calculation nodes when the plurality of processes are executed by the plurality of calculation nodes, each MPI packet further including a header containing information of a calculation time which is required for a calculation to output the communication data;
   referring to a design information stored in the memory;
   executing a communication simulation by specifying an output timing of the obtained communication data using information of the calculation time obtained from the one or more MPI packets, and executing the communication simulation based on the specified output timing;
   storing a simulation result of the simulation target network in the memory on the basis of a result of the executed communication simulation; and
   transmitting the obtained communication data to others of the plurality of calculation nodes.

2. The network performance estimating device according to claim 1, wherein the calculation time is a real time required by the one of the plurality of calculation nodes as a transmission source, and the executing the communication simulation includes converting the real time to a virtual time by using a predetermined function, and specifying the transmission of the communication data on the basis of the virtual calculation time.

3. The network performance estimating device according to claim 1, wherein the simulation result further contains information indicating a load state of the one of the plurality of calculation nodes, and the executing the communication simulation includes calculating a load state of each calculation node on the basis of the calculation time, and including the obtained load state in the simulation result.

4. The network performance estimating device according to claim 1, wherein the design information contains trouble information indicating a trouble occurrence place and a trouble occurrence time in the simulation target network, and the executing of the communication simulation includes executing a communication simulation so as to bypass the trouble occurrence place.

5. The network performance estimating device according to claim 1, wherein the design information contains route determining information defining a method of determining a communication route from a transmission-source calculation node among the plurality of calculation nodes and a destination calculation node among the plurality of calculation nodes, and the executing the communication simulation includes determining the communication route by using the route determining information.

6. A network performance estimating method for controlling a network performance estimating device for estimating network performance of a parallel computing machine including a plurality of calculation nodes and a storing unit that stores design information defining a simulation target network including a plurality of simulation target calculation nodes, the network performance estimating method comprising:
   executing a plurality of parallel processes by the plurality of calculation nodes, wherein each of the plurality of processes communicates with another process in another of the plurality of calculation nodes;
   obtaining one or more message passing interface (MPI) packets, including communication data output, from one of the plurality of calculation nodes when the plurality of processes are executed by the plurality of calculation nodes, each MPI packet further including a header containing information of a calculation time which is required for a calculation to output the communication data;
   referring to the design information stored in the storing unit;
   executing a communication simulation by specifying an output timing of the obtained communication data using information of the calculation time obtained from the one or more MPI packets, and executing the communication simulation based on the specified output timing;
   storing a simulation result of the simulation target network in the storage unit on the basis of a result of the executed communication simulation; and
   transmitting the obtained communication data to others of the plurality of calculation nodes.

7. The network performance estimating method according to claim 6, wherein the calculation time is a real time required by the one of the plurality of calculation nodes as a transmission source, and the executing the communication simulation includes converting the real time to a virtual time by using a predetermined function and specifies the transmission of the communication data on the basis of the virtual calculation time.

8. The network performance estimating method according to claim 6, wherein the simulation result further contains information indicating a load state of the one of the plurality of calculation nodes, and the executing the communication simulation includes calculating the load state of each calculation node on the basis of the calculation time and including the obtained load state in the simulation result.

9. The network performance estimating method according to claim 6, wherein the design information contains trouble information indicating a trouble occurrence place and a trouble occurrence time in the simulation target network, and executing of the communication simulation includes executing a communication simulation so as to bypass the trouble occurrence place.

10. The network performance estimating method according to claim 6, wherein the design information contains route determining information defining a method of determining a communication route from a transmission source calculation node among the plurality of calculation nodes and a destination calculation node among the plurality of calculation nodes, and the executing the communication simulation includes determining the communication route by using the route determining information.

11. A non-transitory computer readable storage medium storing a network performance estimating program directing a computer to perform a process for estimating network performance of a parallel computing machine including a plurality of calculation nodes and a storing unit that stores design information defining a simulation target network including a plurality of simulation target calculation nodes, the process comprising:

executing a plurality of parallel processes using the plurality of calculation nodes, wherein each of the plurality of processes communicates with another process in another of the plurality of calculation nodes;

obtaining one or more message passing interface (MPI) packets, including communication data output, from one of the plurality of calculation nodes when the plurality of processes are executed by the plurality of calculation nodes, each MPI packet further including a header containing information of a calculation time which is required for a calculation to output the communication data;

referring to the design information stored in the storing unit;

executing a communication simulation by specifying an output timing of the obtained communication data using information of the calculation time obtained from the one or more MPI packets, and executing the communication simulation based on the specified output timing;

storing a simulation result of the simulation target network in the storage unit on the basis of a result of the executed communication; and transmitting the obtained communication data to others of the plurality of calculation nodes.

12. The non-transitory computer readable medium according to claim 11, wherein the calculation time is a real time required by the one of the plurality of calculation nodes as a transmission source, and the executing the communication simulation includes converting the real time to a virtual time by using a predetermined function and simulating the transmission of the communication data on the basis of the virtual calculation time.

13. The non-transitory computer readable medium according to claim 11, wherein the simulation result further contains information indicating a load state of the one of the plurality of calculation nodes, and the executing the communication simulation includes calculating the load state of each calculation node on the basis of the calculation time and including the obtained load state in the simulation result.

14. The non-transitory computer readable medium according to claim 11, wherein the design information contains trouble information indicating a trouble occurrence place and a trouble occurrence time in the simulation target network, and the executing of the communication simulation includes executing a communication simulation so as to bypass the trouble occurrence place.

15. The non-transitory computer readable medium according to claim 11, wherein the design information contains route determining information defining a method of determining a communication route from a transmission source calculation node among the plurality of communication nodes and a destination calculation node among the plurality of communication nodes, and the executing the communication simulation includes determining the communication route by using the route determining information.

* * * * *